US011675456B2

(12) United States Patent
Kurasawa et al.

(10) Patent No.: US 11,675,456 B2
(45) Date of Patent: Jun. 13, 2023

(54) DISPLAY APPARATUS WITH ELECTRODES USED FOR SENSING BY BOTH ELECTROMAGNETIC INDUCTION AND BY SELF-CAPACITANCE

(71) Applicant: Japan Display Inc., Tokyo (JP)

(72) Inventors: Hayato Kurasawa, Tokyo (JP); Hiroshi Mizuhashi, Tokyo (JP); Fumitaka Gotoh, Tokyo (JP); Gen Koide, Tokyo (JP); Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/833,954

(22) Filed: Jun. 7, 2022

(65) Prior Publication Data

US 2022/0300139 A1 Sep. 22, 2022

Related U.S. Application Data

(63) Continuation of application No. 17/182,739, filed on Feb. 23, 2021, now Pat. No. 11,385,739, which is a
(Continued)

(30) Foreign Application Priority Data

Aug. 24, 2018 (JP) .............................. JP2018-157658

(51) Int. Cl.
*G06F 3/041* (2006.01)
*G06F 3/044* (2006.01)
*G06F 3/046* (2006.01)

(52) U.S. Cl.
CPC .......... *G06F 3/04166* (2019.05); *G06F 3/046* (2013.01); *G06F 3/0412* (2013.01); *G06F 3/0446* (2019.05); *G06F 2203/04111* (2013.01)

(58) Field of Classification Search
CPC ............... G06F 3/0412; G06F 3/04166; G06F 3/04184; G06F 3/0443; G06F 3/0446;
(Continued)

(56) References Cited

U.S. PATENT DOCUMENTS 11,385,739 B2* 7/2022 Kurasawa ............. G02F 1/1343
2014/0078104 A1* 3/2014 Lee ........................ G06F 3/0446
345/174
(Continued)

FOREIGN PATENT DOCUMENTS

JP 2011-216042 A 10/2011
JP 2016-161963 A 9/2016
JP 2017-162247 A 9/2017

OTHER PUBLICATIONS

Japanese Office Action dated Apr. 25, 2023 for the corresponding Japanese Patent Application No. 2022-077461, with English machine translation.

*Primary Examiner* — Liliana Cerullo
(74) *Attorney, Agent, or Firm* — Michael Best & Friedrich LLP

(57) ABSTRACT

According to an aspect, a display apparatus includes: a substrate; a plurality of pixel electrodes; a plurality of detection electrodes arranged in a matrix in a display area of the substrate; a plurality of detection electrode lines coupled to the respective detection electrodes; a plurality of first electrodes provided in the same layer as the detection electrodes or the detection electrode lines and extending in a first direction; a plurality of switching elements coupled to the respective pixel electrodes; a plurality of signal lines coupled to the switching elements and extending in a second direction crossing the first direction; a coupling member provided in a peripheral area outside the display area and configured to couple ends of the first electrodes to each other; and a drive circuit configured to output a first drive
(Continued)

signal in a first sensing period in which an electromagnetic induction method is used.

3 Claims, 32 Drawing Sheets

Related U.S. Application Data continuation of application No. PCT/JP2019/028666, filed on Jul. 22, 2019.

(58) Field of Classification Search
CPC ........... G06F 3/046; G06F 2203/04106; G06F 2203/04111
See application file for complete search history.

(56) References Cited

U.S. PATENT DOCUMENTS

| | | | |
|---|---|---|---|
| 2017/0108972 A1* | 4/2017 | Kurasawa | G06F 3/0412 |
| 2017/0262102 A1 | 9/2017 | Mizuhashi et al. | |
| 2019/0064944 A1* | 2/2019 | Kobori | G06F 3/044 |
| 2019/0361549 A1* | 11/2019 | Gu | G06F 3/044 |

* cited by examiner

DISPLAY APPARATUS WITH ELECTRODES USED FOR SENSING BY BOTH ELECTROMAGNETIC INDUCTION AND BY SELF-CAPACITANCE

CROSS-REFERENCE TO RELATED APPLICATIONS

This application is a continuation of U.S. patent application Ser. No. 17/182,739, filed on Feb. 23, 2021. Further, this application claims the benefit of priority from Japanese Patent Application No. 2018-157658 filed on Aug. 24, 2018 and International Patent Application No. PCT/JP2019/028666 filed on Jul. 22, 2019, the entire contents of which are incorporated herein by reference.

BACKGROUND

1. Technical Field

The present disclosure relates to a display apparatus.

2. Description of the Related Art

In recent years, a touch detection apparatus that can detect an external proximity object what is called a touch panel has been gaining attention. The touch panel is mounted on or integrated with a display apparatus such as a liquid crystal display apparatus to be used as a touch detection apparatus-equipped display apparatus. As a method for detecting such an external proximity object, a capacitance method and an electromagnetic induction method are known. In the electromagnetic induction method, coils for generating magnetic fields and coils for detecting the magnetic fields are provided in the display device. A pen as an external object is provided with a coil and a capacitance element forming a resonance circuit. The display apparatus detects the pen through electromagnetic induction between each of the coils of the display apparatus and the coil within the pen. Japanese Patent Application Laid-open Publication No. H10-49301 describes a coordinate input apparatus using the electromagnetic induction method.

The capacitance method and the electromagnetic induction method significantly differ from each other in a detection target body and/or the configuration of detection electrodes. Thus, if electrodes and various kinds of wiring provided in the display apparatus and the drive configuration thereof are employed without modification in the electromagnetic induction method, the electromagnetic induction touch detection may be difficult to be satisfactorily performed.

SUMMARY

According to an aspect, a display apparatus includes: a substrate; a plurality of pixel electrodes; a plurality of detection electrodes arranged in a matrix in a display area of the substrate; a plurality of detection electrode lines coupled to the respective detection electrodes; a plurality of first electrodes provided in the same layer as the detection electrodes or the detection electrode lines and extending in a first direction; a plurality of switching elements coupled to the respective pixel electrodes; a plurality of signal lines coupled to the switching elements and extending in a second direction crossing the first direction; a coupling member provided in a peripheral area outside the display area and configured to couple ends of the first electrodes to each other; and a drive circuit configured to output a first drive signal in a first sensing period in which an electromagnetic induction method is used.

According to another aspect, a display apparatus includes: a substrate; a plurality of pixel electrodes; a plurality of detection electrodes arranged in a matrix in a display area of the substrate; a plurality of detection electrode lines coupled to the respective detection electrodes; a plurality of switching elements coupled to the respective pixel electrodes; a second electrode provided between a semiconductor of the switching elements and the substrate in a direction perpendicular to the substrate and extending in a first direction; a plurality of first electrodes provided in the same layer as the detection electrodes or the detection electrode lines and extending in a second direction crossing the first direction; a coupling member provided in a peripheral area outside the display area and configured to couple ends of the first electrodes to each other; and a drive circuit configured to output a first drive signal in a first sensing period in which an electromagnetic induction method is used.

DETAILED DESCRIPTION

The following describes aspects (embodiments) to perform the present disclosure in detail with reference to the accompanying drawings. The details described in the following embodiments do not limit the present disclosure. The components described in the following include ones that can easily be thought of by those skilled in the art and are substantially the same ones. Further, the components described in the following can be combined with each other as appropriate. The disclosure is only by way of example, and some appropriate modifications with the gist of the disclosure maintained that can easily be thought of by those skilled in the art are naturally included in the scope of the present disclosure. The drawings may be represented more schematically for the width, thickness, shape, and the like of parts than those of actual aspects in order to make the description clearer; they are only by way of example and do not limit the interpretation of the present disclosure. In the present specification and drawings, components similar to those previously described for the drawings previously described are denoted by the same symbols, and a detailed description may be omitted as appropriate.

In this disclosure, when an element is described as being "on" another element, the element can be directly on the other element, or there can be one or more elements between the element and the other element.

First Embodiment

Figure 1:
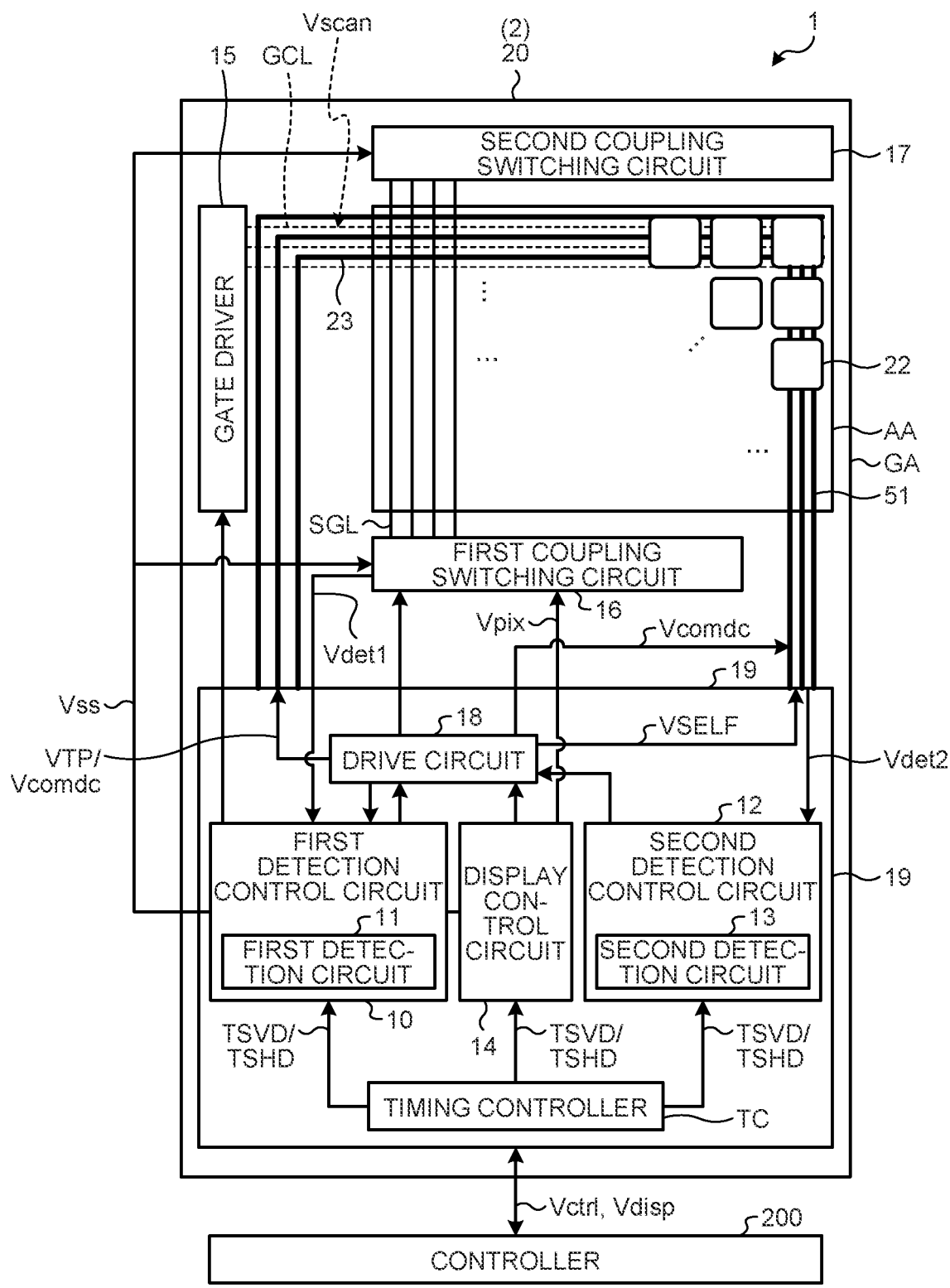
FIG. 1 is a block diagram of a configuration of a display apparatus according to a first embodiment.

FIG. 1 is a block diagram of a configuration of a display apparatus according to a first embodiment. This display apparatus 1 of the present embodiment incorporates a detection function of detecting contact with and/or proximity to a display surface by a detection target body. As illustrated in FIG. 1, the display apparatus 1 includes a display panel 20, a first detection control circuit 10, a second detection control circuit 12, a display control circuit 14, a gate driver 15, a first coupling switching circuit 16, a second coupling switching circuit 17, a drive circuit 18, and a controller 200.

The display panel 20 is a liquid display apparatus that contains liquid crystals as display elements, for example.

The display panel 20 is a device that performs display in accordance with a scanning signal Vscan supplied from the gate driver 15. More specifically, the display panel 20 is a device that sequentially scans horizontal lines one by one to perform display in accordance with the scanning signal Vscan.

The controller 200 is a circuit that supplies a control signal Vctrl to the first detection control circuit 10, the second detection control circuit 12, and the display control circuit 14 to control display and detection of the display panel 20. The first detection control circuit 10, the second detection control circuit 12, and the display control circuit 14 are provided as a drive integrated circuit (IC) 19 in the display panel 20. However, the drive IC 19 may be provided on a wiring substrate 71 or a control circuit board coupled to the display panel 20. At least one of the first detection control circuit 10, the second detection control circuit 12, the drive circuit 18, and the display control circuit 14 may be provided in the display panel 20 without being incorporated into the drive IC 19. The wiring substrate 71 is a flexible printed board, for example.

The display control circuit 14 supplies a control signal to each of the gate driver 15 and the first coupling switching circuit 16 based on a video signal Vdisp supplied from the controller 200.

The gate driver 15 is a circuit that supplies the scanning signal Vscan to the display panel 20 based on the control signal supplied from the display control circuit 14. In other words, the gate driver 15 is a circuit that sequentially selects one horizontal line as an object of display drive.

The first coupling switching circuit 16 and the second coupling switching circuit 17 are switch circuits that change a coupling state of signal lines SGL based on a switching signal Vss from the first detection control circuit 10. The first coupling switching circuit 16 supplies a pixel signal Vpix to each pixel Pix of the display panel 20 based on the control signal supplied from the display control circuit 14 in a display period. The display control circuit 14 supplies a display drive signal Vcomdc to detection electrodes 22 via the drive circuit 18 in the display period.

The display panel 20 has a function of detecting the position of a finger in contact with or in proximity to the display surface of the display panel 20 by self-capacitive touch detection. The display panel 20 also has a function of detecting a touch pen 100 in contact with or in proximity to the display surface by electromagnetic induction touch detection. A timing controller TC supplies control signals TSVD and TSHD to control the timing of the electromagnetic induction touch detection by the first detection control circuit 10, the timing of the self-capacitive touch detection by the second detection control circuit 12, and the timing of display by the display control circuit 14.

The first detection control circuit 10 is a circuit that controls the electromagnetic induction touch detection based on the control signals TSVD and TSHD supplied from the timing controller TC included in the drive IC 19. The first detection control circuit 10 supplies a first drive signal VTP to transmission coils CTx formed by electrodes or wiring lines of the display panel 20 via the drive circuit 18 in an electromagnetic induction detection period (hereinafter, represented as a first sensing period). Reception coils CRx of the display panel 20, when detecting contact or proximity of the touch pen 100 by the electromagnetic induction method, outputs a first detection signal Vdet1 to the first detection control circuit 10. In the present embodiment, the transmission coils CTx are first electrodes 23, whereas the reception coils CRx are the signal lines SGL.

The second detection control circuit 12 is a circuit controlling the capacitive touch detection based on the control signals supplied from the controller 200 and the timing controller TC. The second detection control circuit 12 supplies a second drive signal VSELF to the detection electrodes 22 of the display panel 20 via the drive circuit 18 in a capacitive detection period (hereinafter, represented as a second sensing period). The display panel 20, when detecting contact or proximity of the finger by the capacitance method, outputs a second detection signal Vdet2 to the second detection control circuit 12. The first drive signal VTP and the second drive signal VSELF are each an alternating current (AC) rectangular wave with a certain frequency (several kilohertz to several hundred kilohertz, for example), for example. The AC waveform of the first drive signal VTP and the second drive signal VSELF may be a sinusoidal wave or a triangular wave.

The first detection control circuit 10 includes a first detection circuit 11 that receives the first detection signals Vdet1 from the reception coils CRx. The first detection circuit 11 transmits the received first detection signals Vdet1 as output signals to outside the display panel 20 (the controller 200, for example). The second detection control circuit 12 includes a second detection circuit 13 that receives the second detection signals Vdet2 from the detection electrodes 22. The second detection circuit 13 transmits the received second detection signals Vdet2 as output signals to outside the display panel 20 (the controller 200, for example). The first detection circuit 11 and the second detection circuit 13 are each an analog front end (hereinafter, represented as AFE) circuit, for example. The first detection circuit 11 and the second detection circuit 13 each include a filter circuit reducing noise of the first detection signal Vdet1 and the second detection signal Vdet2 respectively supplied thereto and/or a signal processing circuit performing signal adjustment such as an amplifier circuit amplifying signal components thereof, for example. The first detection circuit 11 and the second detection circuit 13 do not necessarily include the signal processing circuit and may supply, to the controller 200, the first detection signals Vdet1 and the second detection signals Vdet2 as they are as the output signals, and the controller 200 may include the signal processing circuits such as the filter circuit and the amplifier circuit.

The first detection control circuit 10 and the second detection control circuit 12 may each include an analog-to-digital (A/D) conversion circuit, a signal processing circuit, and a coordinate extraction circuit performing signal processing on the first detection signal Vdet1 and the second detection signal Vdet2, respectively. Alternatively, the controller 200 may include the signal processing circuit and the coordinate extraction circuit.

The A/D conversion circuit samples an analog signal output from the display panel 20 at a timing synchronized with the first drive signal VTP or the second drive signal VSELF to convert it into a digital signal.

The signal processing circuit is a logic circuit that detects the presence or absence of a touch on the display panel 20 based on an output signal of the A/D conversion circuit. The signal processing circuit performs processing to extract a signal of a difference in the detection signals caused by the finger (an absolute value $|\Delta V|$). The signal processing circuit compares the absolute value $|\Delta V|$ with a certain threshold voltage and, if this absolute value $|\Delta V|$ is less than the threshold voltage, determines that the detection target body is not present. On the other hand, if the absolute value $|\Delta V|$ is the threshold voltage or greater, the signal processing circuit determines that the detection target body is present.

The coordinate extraction circuit is a logic circuit that determines, when the detection target body has been detected by the signal processing circuit, the coordinates of the detection target body. The coordinate extraction circuit outputs the coordinates of the detection target body as an output signal. The coordinate extraction circuit outputs the output signal to outside the display panel 20 (the controller 200, for example).

Figure 2:
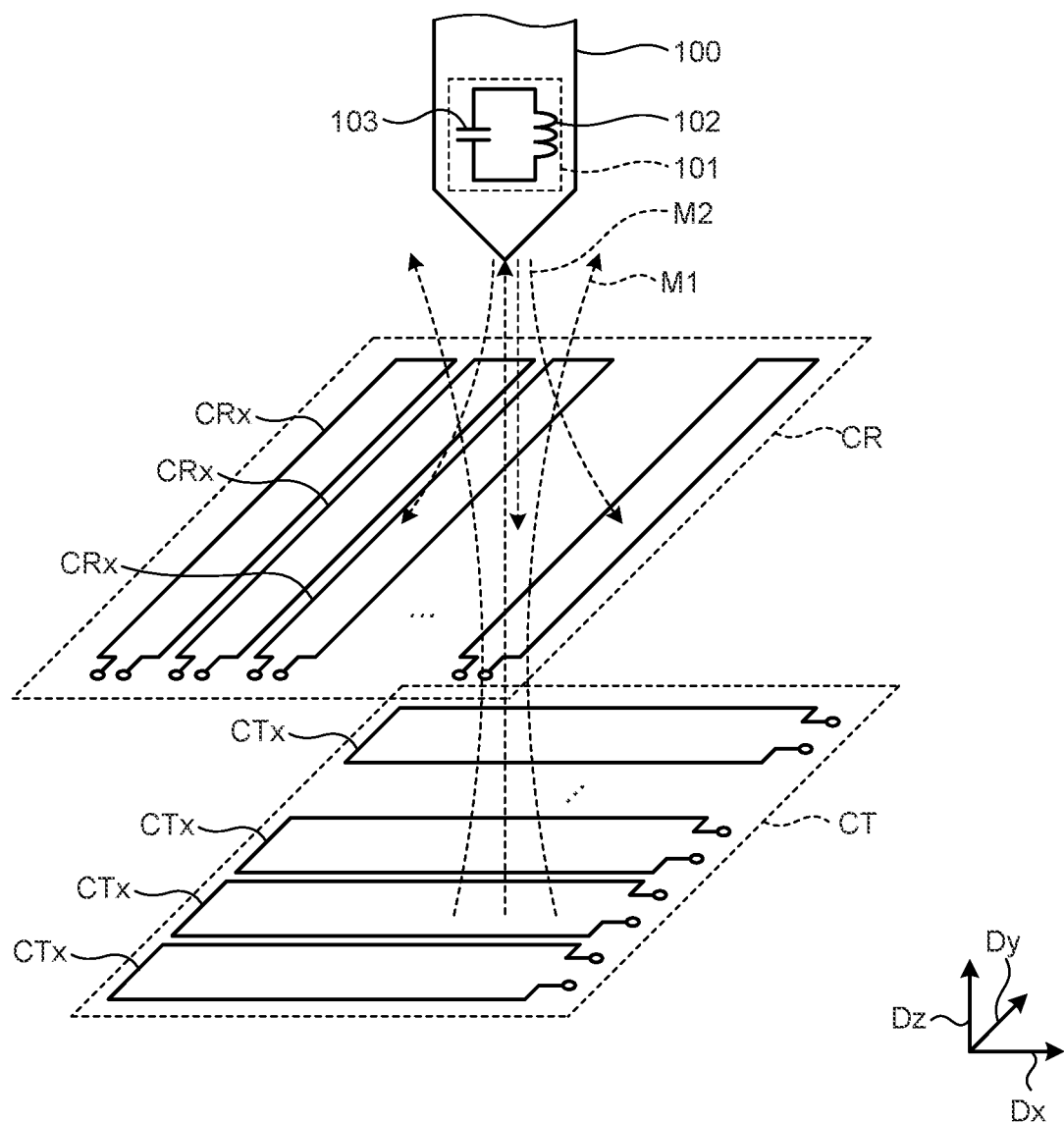
FIG. 2 is an illustrative diagram for describing electromagnetic induction touch detection.

The following describes the electromagnetic induction touch detection performed by the display panel 20 according to the present embodiment with reference to FIG. 2. FIG. 2 is an illustrative diagram for describing the electromagnetic induction touch detection.

As illustrated in FIG. 2, the electromagnetic induction method detects contact or proximity of the touch pen 100. A resonance circuit 101 is provided in the touch pen 100. The resonance circuit 101 includes a coil 102 and a capacitance element 103 coupled to each other in parallel.

In the electromagnetic induction method, the transmission coils CTx and the reception coils CRx are provided overlapping with each other. The transmission coils CTx each have a longitudinal direction along a first direction Dx, whereas the reception coils CRx each have a longitudinal direction along a second direction Dy. The reception coils CRx are provided crossing the transmission coils CTx in a plan view. The transmission coils CTx are coupled to the drive circuit 18, whereas the reception coils CRx are coupled to the first detection circuit 11 (refer to FIG. 1).

As illustrated in FIG. 2, in a magnetic field generation period, an AC rectangular wave with a certain frequency (several kilohertz to several hundred kilohertz, for example) is applied to the transmission coils CTx via the drive circuit 18 by the first detection control circuit 10. Thus, a current passes through the transmission coils CTx, and the transmission coils CTx generate a magnetic field M1 corresponding to this change in current. When the touch pen 100 is in a contact state or in a proximity state, an electromotive force due to mutual induction between the transmission coils CTx and the coil 102 is generated in the coil 102. Thus, the capacitance element 103 is charged.

Next, in a magnetic field detection period, the coil 102 of the touch pen 100 generates a magnetic field M2 changing in accordance with the resonance frequency of the resonance circuit 101. The magnetic field M2 passes through the reception coils CRx, whereby an electromotive force due to mutual induction between the reception coils CRx and the coil 102 is generated in the reception coils CRx. A current corresponding to the electromotive force of the reception coils CRx passes through the first detection circuit 11. The transmission coils CTx and the reception coils CRx are scanned, whereby detection of the touch pen 100 is performed.

Figure 3:
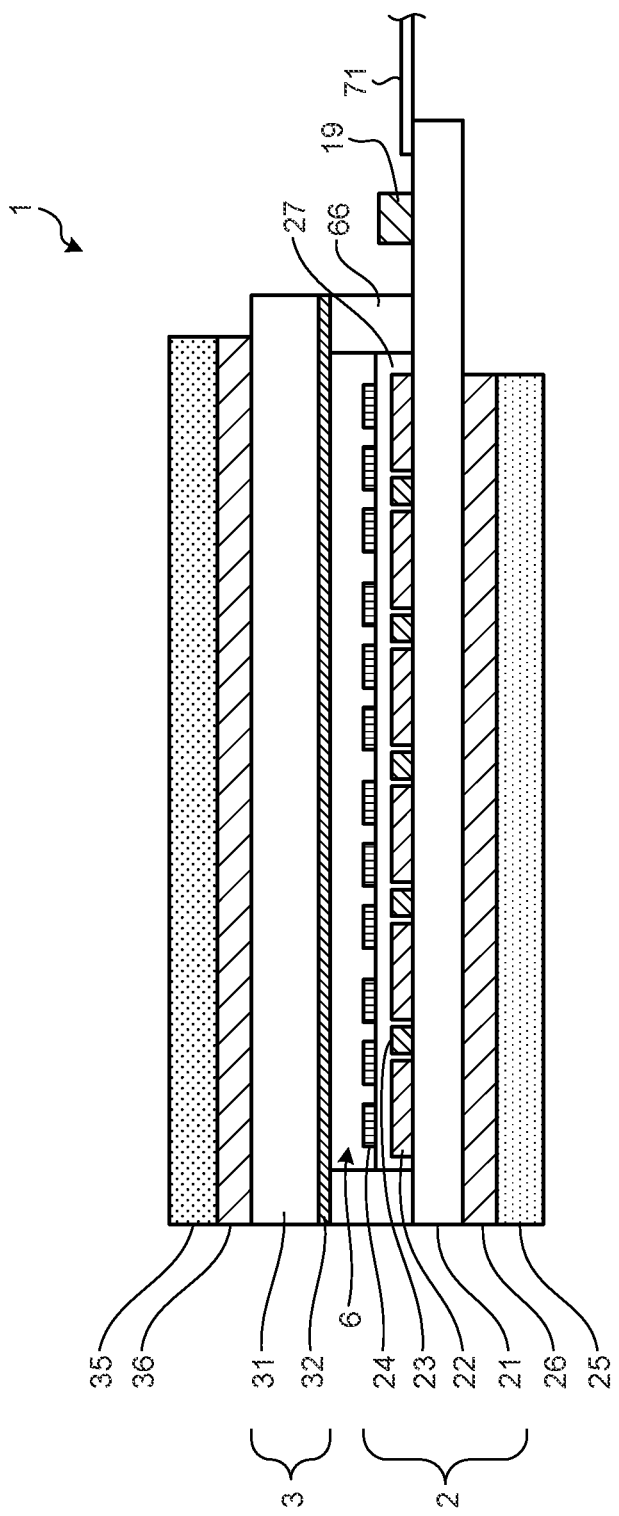
FIG. 3 is a sectional view of a schematic structure of the display apparatus according to the first embodiment.
Figure 4:
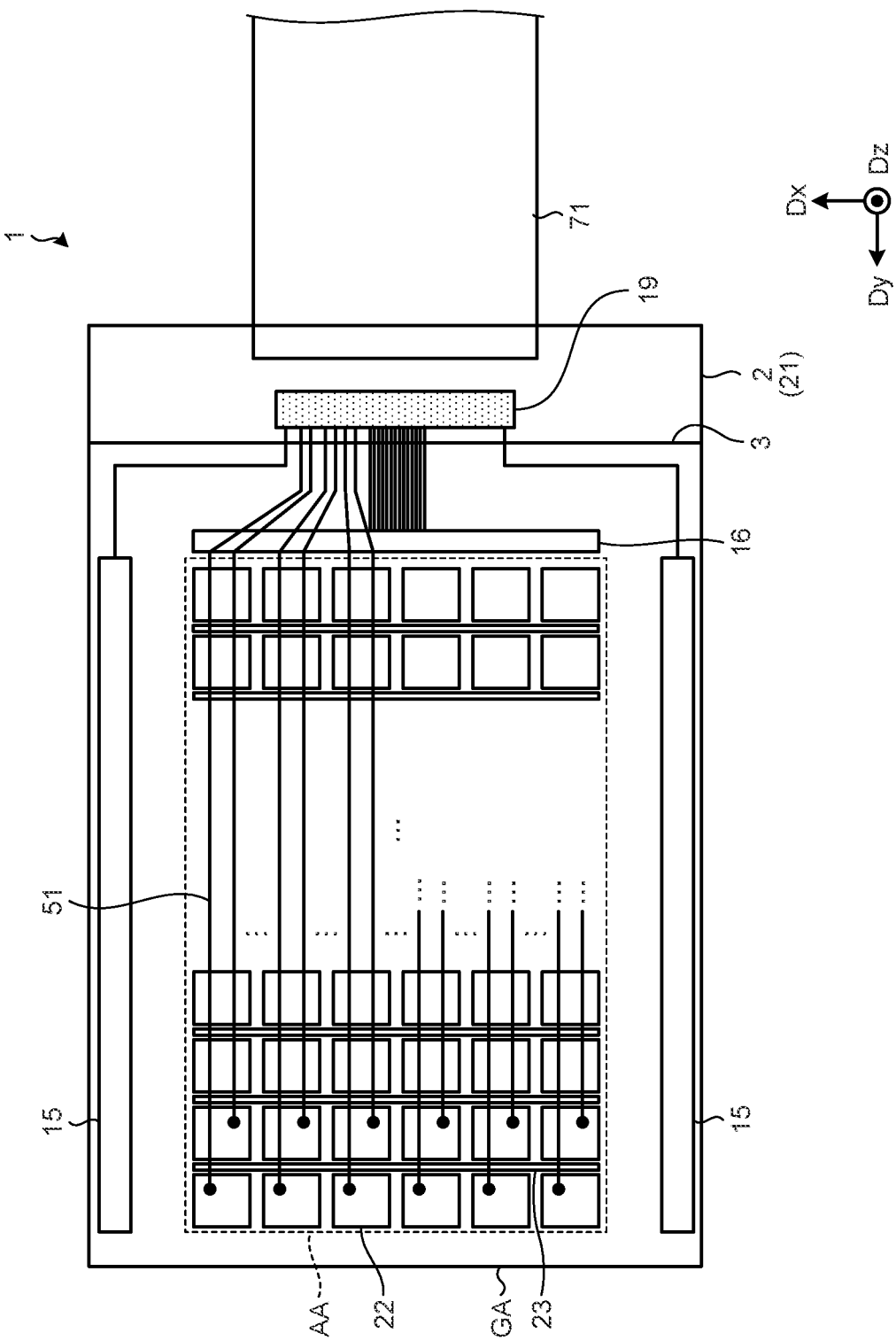
FIG. 4 is a plan view schematically illustrating the display apparatus according to the first embodiment.

FIG. 3 is a sectional view of a schematic structure of the display apparatus according to the first embodiment. FIG. 4 is a plan view schematically illustrating the display apparatus according to the first embodiment. As illustrated in FIG. 3, the display apparatus 1 includes an array substrate 2, a counter substrate 3, a liquid crystal layer 6, a polarizing plate 25, and a polarizing plate 35. The counter substrate 3 is placed facing the surface of the array substrate 2 in a direction perpendicular thereto. The liquid crystal layer 6 is provided between the array substrate 2 and the counter substrate 3.

The array substrate 2 includes a first substrate 21, the detection electrodes 22, the first electrodes 23, and pixel electrodes 24. The array substrate 2 is a drive circuit substrate to drive the pixels Pix and is also called a back plane. The first substrate 21 is provided with circuits such as a gate scanner included in the gate driver 15, switching elements Tr such as thin film transistors (TFTs), and various kinds of wiring such as gate lines GCL and the signal lines SGL (refer to FIG. 5). The pixel electrodes 24 are arranged in a matrix (row-column configuration) on one surface of the first substrate 21.

The detection electrodes 22 and the first electrodes 23 are provided between the first substrate 21 and the pixel electrodes 24. The pixel electrodes 24 are insulated from the detection electrodes 22 and the first electrodes 23, with an insulating layer 27 therebetween. The polarizing plate 25 is provided on the other surface of the first substrate 21 with an adhesive layer 26 therebetween. Although the present embodiment describes an example in which the pixel electrodes 24 are provided on the upper sides of the detection electrodes 22 and the first electrodes 23, at least one of the detection electrodes 22 and the first electrodes 23 may be provided on the upper sides of the pixel electrodes 24. In other words, the pixel electrodes 24 may be provided between the first substrate 21 and at least one of the detection electrodes 22 and the first electrodes 23.

The first substrate 21 is provided with the drive IC 19 and the wiring substrate 71. The drive IC 19 includes all or some of the functions of the first detection control circuit 10, the second detection control circuit 12, and the display control circuit 14 illustrated in FIG. 1. The drive IC 19 may include two or more IC chips, and one or some of the IC chips may be placed on the wiring substrate 71.

As illustrated in FIG. 3, the counter substrate 3 includes a second substrate 31 and a color filter 32. The color filter 32 is provided on a surface of the second substrate 31 facing the first substrate 21. The color filter 32 faces the liquid crystal layer 6 in a direction perpendicular to the first substrate 21. The polarizing plate 35 is provided on the second substrate 31 with an adhesive layer 36 therebetween. The first substrate 21 and the second substrate 31 are each a glass substrate having translucency enabling visible light to pass therethrough. Alternatively, the first substrate 21 and the second substrate 31 may be a translucent resin substrate or a resin film formed of resin such as polyimide. The color filter 32 may be provided on the first substrate 21.

The first substrate 21 and the second substrate 31 are placed facing each other with a certain gap provided therebetween by a seal part 66. The liquid crystal layer 6 is provided in a space surrounded by the first substrate 21, the second substrate 31, and the seal part 66. The liquid crystal layer 6 modulates light passing therethrough in accordance with the state of an electric field, and liquid crystals with a lateral electric field mode such as in-plane switching (IPS) including fringe field switching (FFS) are used therefor, for example. The liquid crystal layer 6 is provided as a display layer to display an image. An orientation film is placed between the liquid crystal layer 6 and the array substrate 2 and between the liquid crystal layer 6 and the counter substrate 3 illustrated in FIG. 3.

In the present specification, a direction toward the second substrate 31 from the first substrate 21 in a direction perpendicular to the surface of the first substrate 21 is referred to as "upper side." A direction toward the first substrate 21 from the second substrate 31 is referred to as "lower side." The "plan view" indicates a case when viewed from the direction perpendicular to the surface of the first substrate 21

The first direction Dx and the second direction Dy are each a direction parallel to the surface of the first substrate 21. The first direction Dx is orthogonal to the second direction Dy. However, the first direction Dx may cross the second direction Dy without being orthogonal thereto. A third direction Dz is a direction perpendicular to the surface of the first substrate 21. The third direction Dz is orthogonal to the first direction Dx and the second direction Dy.

As illustrated in FIG. 4, the first substrate 21 is provided with an area corresponding to a display area AA of the display panel 20 and an area corresponding to a peripheral area GA provided outside the display area AA. The display AA is an area overlapping with the pixels Pix. The display area AA is an area including detection elements such as the detection electrodes 22 and the first electrodes 23. In other words, the display area AA is an area that can detect the presence or absence of a touch of a finger or the like and/or the touch pen 100.

The detection electrodes 22 are arranged in a matrix (row-column configuration) in the display area AA. Each of the detection electrodes 22 is of rectangular shape or square shape in a plan view. The detection electrodes 22 are formed of a conductive material having translucency such as indium tin oxide (ITO), for example. The detection electrodes 22 may be of another shape such as a polygonal shape.

Detection electrode lines 51 are electrically coupled to the respective detection electrodes 22. The detection electrode lines 51 extend in the second direction Dy and are arranged in the first direction Dx. In the present embodiment, the detection electrode lines 51 are provided in a different layer from the detection electrodes 22 and are provided in areas overlapping with the detection electrodes 22 in a plan view. The detection electrode lines 51 are each coupled to the second detection circuit 13 included in the drive IC 19.

The first electrodes 23 each extend in the first direction Dx and are arranged in the second direction Dy. Each of the detection electrodes 22 arranged in the first direction Dx is placed adjacent to a corresponding one of the first electrodes 23 in the second direction Dy. The first electrodes 23 are each placed between the detection electrodes 22 adjacent to each other in the second direction Dy. The first electrodes 23 are provided in the same layer as the detection electrodes 22 and are provided in areas not overlapping with the detection electrodes 22 in a plan view. The first electrodes 23 are also separate from the detection electrode lines 51. The first electrodes 23 are formed of the same material as that of the detection electrodes 22, or a conductive material having translucency such as indium tin oxide (ITO), for example.

Figure 5:
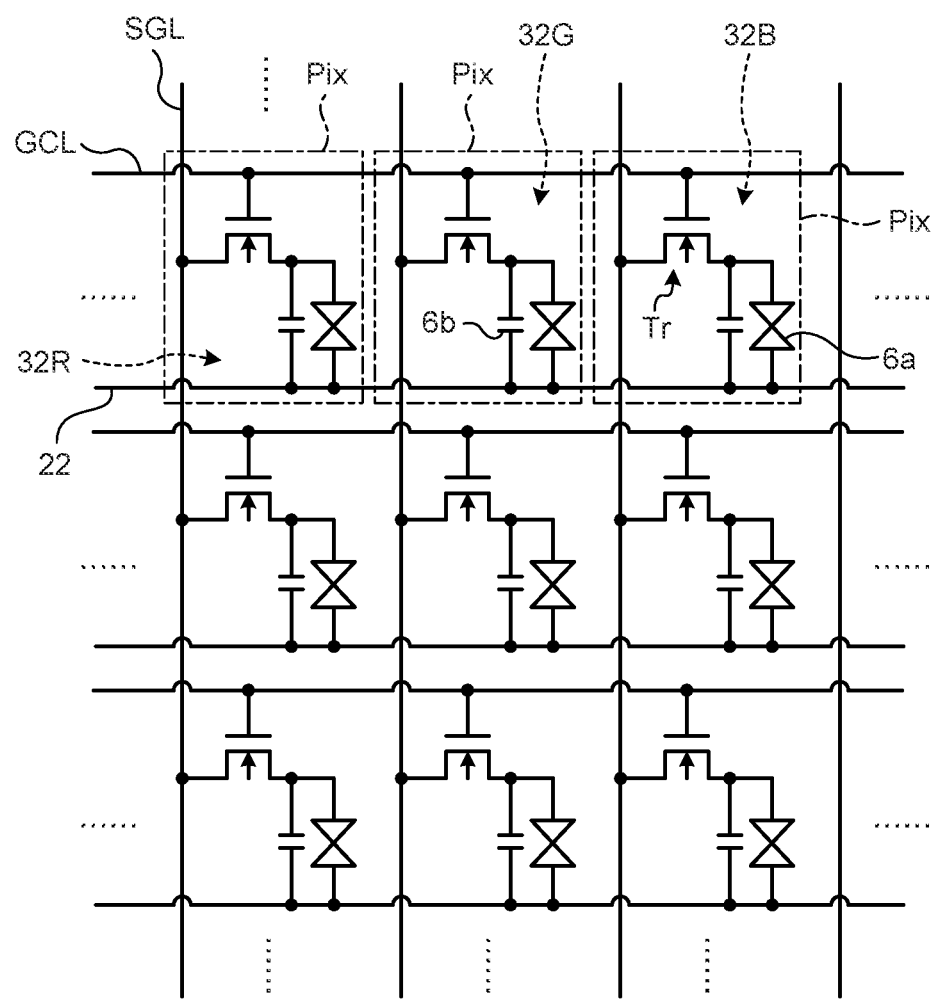
FIG. 5 is a circuit diagram of pixel arrangement of the display apparatus according to the first embodiment.

FIG. 5 is a circuit diagram of pixel arrangement of the display apparatus according to the first embodiment. As illustrated in FIG. 5, the display panel 20 includes the pixels Pix arranged in a matrix (row-column configuration). The pixels Pix each include a switching element Tr and a liquid crystal element 6a. The switching element Tr is fabricated from a thin film transistor, and, in this example, fabricated from a TFT of an n-channel metal oxide semiconductor (MOS) type. The insulating layer 27 is provided between the pixel electrodes 24 and the detection electrodes 22 (common electrodes), and these components form a holding capacitance 6b illustrated in FIG. 5.

The gate driver 15 illustrated in FIG. 1 sequentially selects the gate lines GCL. The gate driver 15 applies the scanning signal Vscan to gates of the switching elements Tr of the pixels Pix via a selected gate line GCL. Thus, one line (one horizontal line) of the pixels Pix is sequentially selected as the object of display drive. A source driver included in the display control circuit 14 supplies the pixel signals Vpix to the pixels Pix included in the selected one horizontal line via the signal lines SGL. Thus, in these pixels Pix, display is performed horizontal line by horizontal line in accordance with the supplied pixel signals Vpix. In FIG. 4, the gate driver 15 is provided in each of two areas in the peripheral area GA that are opposed to each other with the display area AA therebetween but may be provided in one of the areas.

In the color filter 32 illustrated in FIG. 3, a color area 32R, a color area 32G, and a color area 32B of the color filter 32 colored in three colors, or red (R), green (G), and blue (B), respectively, for example, are periodically arranged. The color area 32R, the color area 32G, and the color area 32B of the three colors of R, G, and B are associated with each pixel Pix illustrated in FIG. 5. The color areas associated with each pixel Pix are only required to be different colors and may be a combination of other colors. The color areas associated with each pixel Pix are not limited to the combination of three colors and may be a combination of four or more colors.

The detection electrodes 22 illustrated in FIG. 3 and FIG. 4 function as the common electrodes that apply a common potential to the pixels Pix of the display panel 20 and also function as drive electrodes and detection electrodes when the touch detection using the self-capacitance method is performed. In the display period, the display control circuit 14 supplies the display drive signal Vcomdc to the detection electrodes 22 via the drive circuit 18.

As an example of a method for operating the display apparatus 1, the display apparatus 1 performs the electromagnetic induction touch detection (the first sensing period), the self-capacitive touch detection (the second sensing period), and a display operation (the display period) in a time-division manner. The detections and the display may be performed in any divided form.

Figure 6:
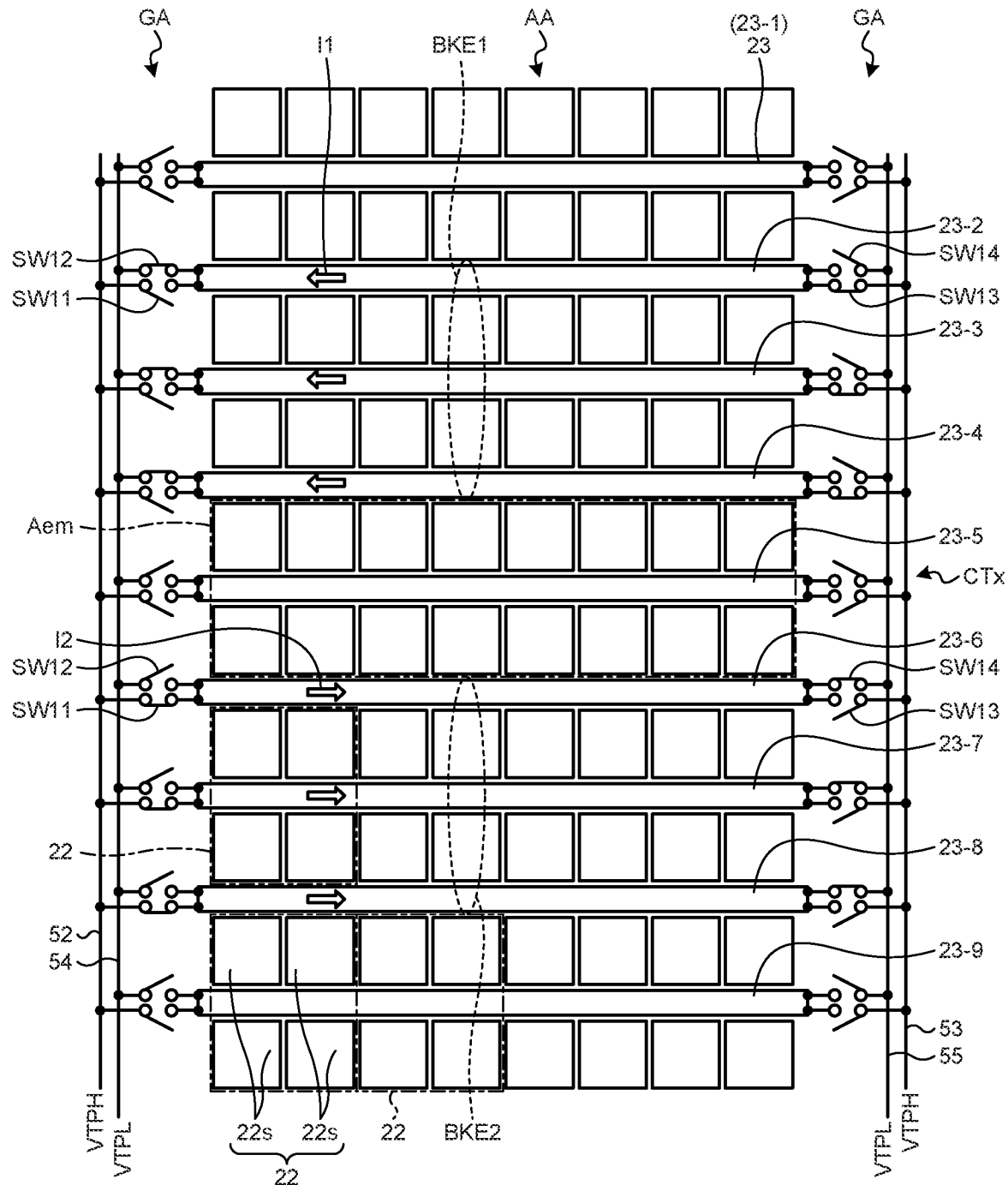
FIG. 6 is a circuit diagram of a coupling configuration of first electrodes.
Figure 7:
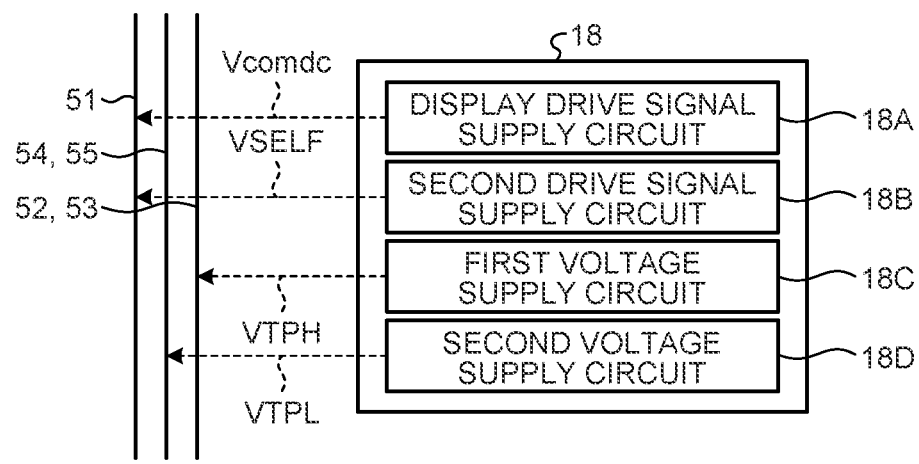
FIG. 7 is a block diagram of a drive circuit supplying various kinds of signals.

FIG. 6 is a circuit diagram of a coupling configuration of the first electrodes. FIG. 7 is a block diagram of a drive circuit supplying various kinds of signals. FIG. 6 illustrates the coupling configuration of the first electrodes in the first sensing period.

As illustrated in FIG. 6, a plurality of first electrodes 23-1, 23-2, . . . , and 24-9 are arranged in the second direction Dy. In the following description, when there is no need to distinguish the first electrodes 23-1, 23-2, . . . , and 23-9 from each other, they are represented as a first electrode 23. In the following description, with reference to FIG. 6, one end of the first electrode 23 is represented as a left end, whereas the other end thereof is represented as a right end.

A first drive signal supply line 52 and a second drive signal supply line 54 are provided on the left end sides of the first electrodes 23, whereas a first drive signal supply line 53 and a second drive signal supply line 55 are provided on the right end sides thereof. The first drive signal supply lines 52 and 53 and the second drive signal supply lines 54 and 55 are wiring to supply the first drive signal VTP to the first electrodes 23.

Switches SW11 are provided between the left ends of the respective first electrodes 23 and the first drive signal supply line 52. Switches SW12 are provided between the left ends of the respective first electrodes 23 and the second drive signal supply line 54. The switch SW11 and the switch SW12 are coupled in parallel to the left end of the first electrode 23.

Switches SW13 are provided between the right ends of the respective first electrodes 23 and the first drive signal supply line 53. Switches SW14 are provided between the right ends of the respective first electrodes 23 and the second drive signal supply line 55. The switch SW13 and the switch SW14 are coupled in parallel to the right end of the first electrode 23. The first drive signal supply lines 52 and 53, the second drive signal supply lines 54 and 55, and the switches SW11 to SW14 are provided in the peripheral area GA. The first drive signal supply lines 52 and 53, the second drive signal supply lines 54 and 55, and the switches SW11 to SW14 are coupling members for coupling the ends of the first electrodes 23 to each other.

As illustrated in FIG. 7, the drive circuit 18 supplies the various kinds of signals to the detection electrodes 22 and the first electrodes 23 via the detection electrode lines 51, the first drive signal supply lines 52 and 53, and the second drive signal supply lines 54 and 55. The drive circuit 18 includes a display drive signal supply circuit 18A, a second drive signal supply circuit 18B, a first voltage supply circuit 18C, and a second voltage supply circuit 18D. The display drive signal supply circuit 18A, the second drive signal supply circuit 18B, the first voltage supply circuit 18C, and the second voltage supply circuit 18D are mounted on the drive IC 19 (refer to FIG. 1). At least one of the display drive signal supply circuit 18A, the second drive signal supply circuit 18B, the first voltage supply circuit 18C, and the second voltage supply circuit 18D may be provided as a circuit in the display panel 20.

The display drive signal supply circuit 18A supplies the display drive signal Vcomdc to the detection electrodes 22 via the detection electrode lines 51. The display drive signal supply circuit 18A supplies the display drive signal Vcomdc to the first electrodes 23 via the first drive signal supply lines 52 and 53 or the second drive signal supply lines 54 and 55. The second drive signal supply circuit 18B supplies the second drive signal VSELF for detection to the detection electrodes 22 via the detection electrode lines 51. The first voltage supply circuit 18C supplies a first voltage VTPH that is a direct current (DC) voltage having a first potential, to the first electrodes 23 via the first drive signal supply lines 52 and 53. The second voltage supply circuit 18D supplies a second voltage VTPL to the first electrodes 23 via the second drive signal supply lines 54 and 55. The second voltage VTPL is a DC voltage signal having a second potential smaller than the first potential.

As illustrated in FIG. 6, in the electromagnetic induction detection period, the switches SW11, SW12, SW13, and SW14 operate in accordance with the control signal from the first detection control circuit 10 to select the first electrodes 23 forming the transmission coils CTx. Specifically, first electrodes 23-2, 23-3, and 23-4 and first electrodes 23-6, 23-7, and 23-8 are selected as first electrode blocks BKE1 and BKE2, respectively. The other first electrodes 23 are a non-selected electrode block. An area between the first electrode 23-4 and the first electrode 23-6 is a detection area Aem for detecting the detection target body.

On the left sides of the first electrodes 23-2, 23-3, and 23-4, the switches SW11 are turned off, whereas the switches SW12 are turned on. Thus, the left ends of the first electrodes 23-2, 23-3, and 23-4 are electrically coupled to the second drive signal supply line 54. On the right sides of the first electrodes 23-2, 23-3, and 23-4, the switches SW13 are turned on, whereas the switches SW14 are turned off. Thus, the right ends of the first electrodes 23-2, 23-3, and 23-4 are electrically coupled to the first drive signal supply line 53.

On the left sides of the first electrodes 23-6, 23-7, and 23-8, the switches SW11 are turned on, whereas the switches SW12 are turned off. Thus, the left ends of the first electrodes 23-6, 23-7, and 23-8 are electrically coupled to the first drive signal supply line 52. On the right sides of the first electrodes 23-6, 23-7, and 23-8, the switches SW13 are turned off, whereas the switches SW14 are turned on. Thus, the right ends of the first electrodes 23-6, 23-7, and 23-8 are electrically coupled to the second drive signal supply line 55.

Thus, in the first sensing period, the second voltage supply circuit 18D is coupled to the left end sides of the first electrodes 23-2, 23-3, and 23-4, whereas the first voltage supply circuit 18C is coupled to the right end sides thereof. The first voltage supply circuit 18C is coupled to the left end sides of the first electrodes 23-6, 23-7, and 23-8, whereas the second voltage supply circuit 18D is coupled to the right end sides thereof.

The second voltage supply circuit 18D supplies the second voltage VTPL to the left ends of the first electrodes 23-2, 23-3, and 23-4 via the second drive signal supply line 54. The first voltage supply circuit 18C supplies the first voltage VTPH to the right ends of the first electrodes 23-2, 23-3, and 23-4 via the first drive signal supply line 53. Thus, potential differences are generated between the left ends and the right ends of the first electrodes 23-2, 23-3, and 23-4, and currents I1 flow in a direction from the right ends toward the left ends thereof.

The first voltage supply circuit 18C supplies the first voltage VTPH to the left ends of the first electrodes 23-6, 23-7, and 23-8 via the first drive signal supply line 52. The second voltage supply circuit 18D supplies the second voltage VTPL to the right ends of the first electrodes 23-6, 23-7, and 23-8 via the second drive signal supply line 55. Thus, potential differences are generated between the left ends and the right ends of the first electrodes 23-6, 23-7, and 23-8, and currents I2 flow in a direction from the left ends toward the right ends thereof.

The first detection control circuit 10 switches the operations of the switches SW11, SW12, SW13, and SW14 to change the first voltage VTPH and the second voltage VTPL to be supplied to both ends of the first electrodes 23 at a certain frequency. Thus, the first drive signal VTP as an AC voltage signal is supplied to the first electrodes 23.

The currents I1 and I2 passing through the first electrodes 23 generate magnetic fields to cause electromagnetic induction. The current I1 and the current I2 flow in mutually opposite directions. Thus, the magnetic field generated by the current I1 and the magnetic field generated by the current I2 overlap with each other in the detection area Aem. Thus, the intensity of a magnetic field passing through the detection area Aem can be increased. The magnetic field generated by the current I1 and the current I2 corresponds to the magnetic field M1 generated in the magnetic field generation period using the electromagnetic induction method illustrated in FIG. 2. The first electrodes 23-2, 23-3, and 23-4 included in the first electrode block BKE1 and the first electrodes 23-6, 23-7, and 23-8 included in the first electrode block BKE2 correspond to the transmission coil CTx.

In FIG. 6, for the first electrodes 23 (the first electrodes 23-1, 23-5, and 23-9) of the non-selected electrode block, the switches SW11 and SW12 and the switches SW13 and SW14 are turned off. Thus, the first electrodes 23 of the non-selected electrode block are caused to be in a floating state.

The first detection control circuit 10 sequentially selects the first electrode 23-1 to the first electrode 23-9. Thus, the touch detection for the entire display area AA is performed using the electromagnetic induction method. The peripheral area GA may also be provided with the first electrodes 23. Thus, a magnetic field can also be generated in the peripheral area of the display area AA.

In FIG. 6, six first electrodes 23 form the transmission coil CTx. However, this is not limiting; the transmission coil CTx may be formed by one or two first electrodes 23 placed on one side of the detection area Aem and one or two first electrodes 23 placed on the other side thereof. The transmission coil CTx may be formed by four or more first electrodes 23 placed on the one side of the detection area Aem and four or more first electrodes 23 placed on the other side thereof. The number of the first electrodes 23 for forming the coil need not be the same between one side and the other side. A configuration can be employed in which the number of the first electrodes 23 on the one side is different from the number of the first electrodes 23 on the other side. The number of the first electrodes 23 placed between the first electrodes 23 through which the currents flow in different directions is not limited to one and may be zero or an integer of two or more.

In the display period, all the switches SW11 and SW13 are turned off, whereas all the switches SW12 and SW14 are turned on in accordance with the control signal from the first detection control circuit 10. Thus, all the first electrodes 23 are cut off from the first drive signal supply lines 52 and 53, the second drive signal supply line 54 is coupled to the left ends of all the first electrodes 23, and the second drive signal supply line 55 is coupled to the right ends thereof.

Thus, in the display period, the display drive signal supply circuit 18A supplies the display drive signal Vcomdc to all the first electrodes 23 via the second drive signal supply lines 54 and 55. At the same time, the display drive signal supply circuit 18A also supplies the display drive signal Vcomdc to the detection electrodes 22 via the detection electrode lines 51.

In the second sensing period, the second drive signal supply circuit 18B supplies the second drive signal VSELF for detection to the detection electrodes 22 via the detection electrode lines 51. The detection electrodes 22 output a signal corresponding to a self-capacitance change caused by contact or proximity of the detection target body (the second detection signal Vdet2) to the second detection circuit 13. In this case, the first detection control circuit 10 turns on all the switches SW11 and SW13 and turns off all the switches SW12 and SW14. The second drive signal supply circuit 18B supplies a guard drive signal to all the first electrodes 23 via the first drive signal supply lines 52 and 53. The guard drive signal is a voltage signal synchronized with the second drive signal VSELF and having the same amplitude as that of the second drive signal VSELF. The guard drive signal may be a signal of the same potential as that of the second drive signal VSELF. Thus, the display apparatus 1 can hamper influence that would be caused by capacitance coupling between the detection electrodes 22 and the first electrodes 23.

The coupling configuration illustrated in FIG. 6 is only by way of example and can be changed as appropriate. In the electromagnetic induction detection period, the first voltage supply circuit 18C and the second voltage supply circuit 18D may respectively supply the first voltage VTPH and the second voltage VTPL only to the left ends of the first electrodes 23, for example. The second voltage supply circuit 18D supplies the second voltage VTPL to the left ends of the first electrodes 23-2, 23-3, and 23-4 via the second drive signal supply line 54. The first voltage supply circuit 18C supplies the first voltage VTPH to the left ends of the first electrodes 23-6, 23-7, and 23-8 via the first drive signal supply line 52.

The right ends of the first electrodes 23-2, 23-3, and 23-4 are electrically coupled to the right ends of the first electrodes 23-6, 23-7, and 23-8 through at least one of the first drive signal supply line 53 and the second drive signal supply line 55. Also in this case, the first electrodes 23-2, 23-3, and 23-4 and the first electrodes 23-6, 23-7, and 23-8 are formed into the transmission coil CTx.

Figure 8:
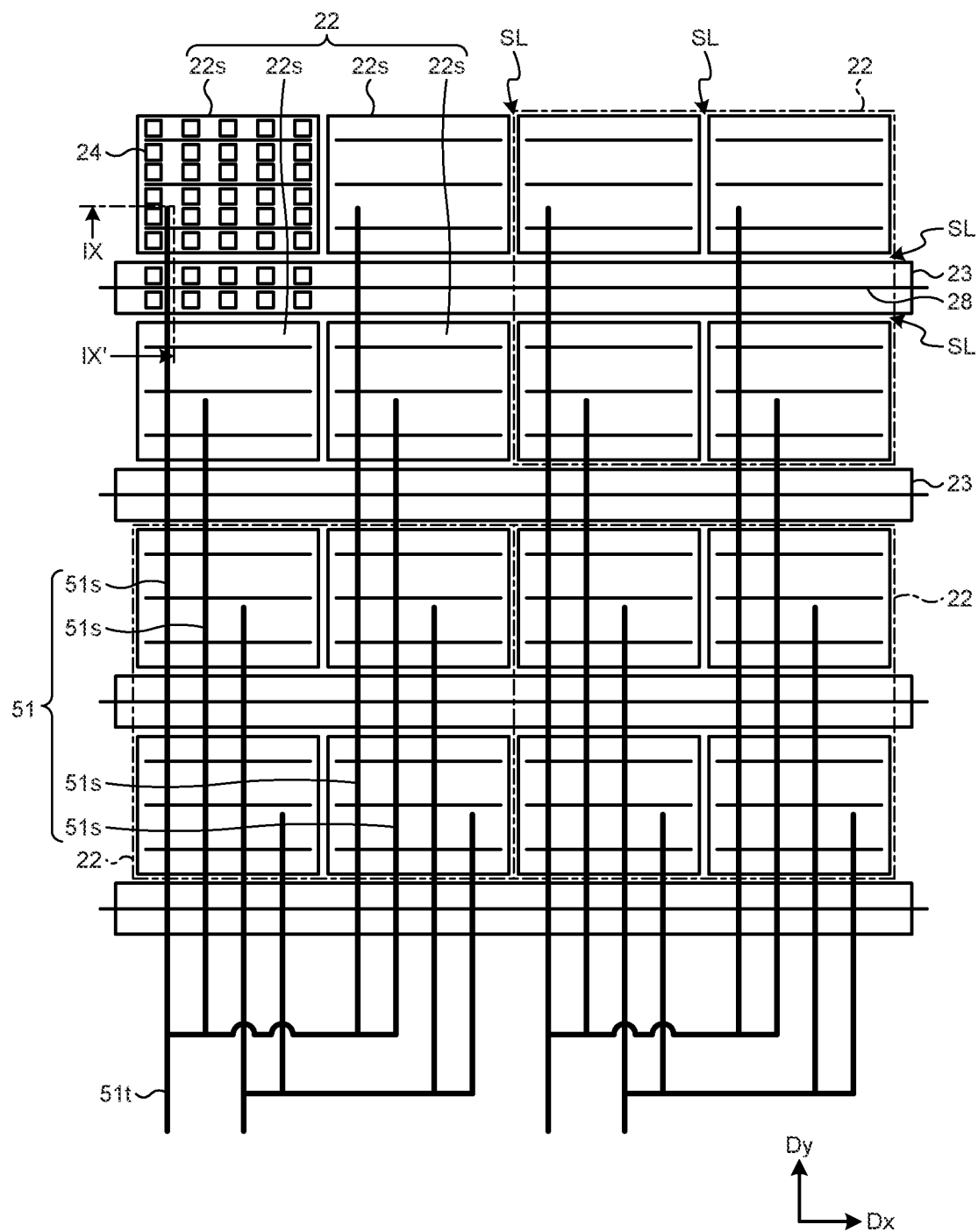
FIG. 8 is a plan view of detection electrodes and the first electrodes according to the first embodiment.
Figure 9:
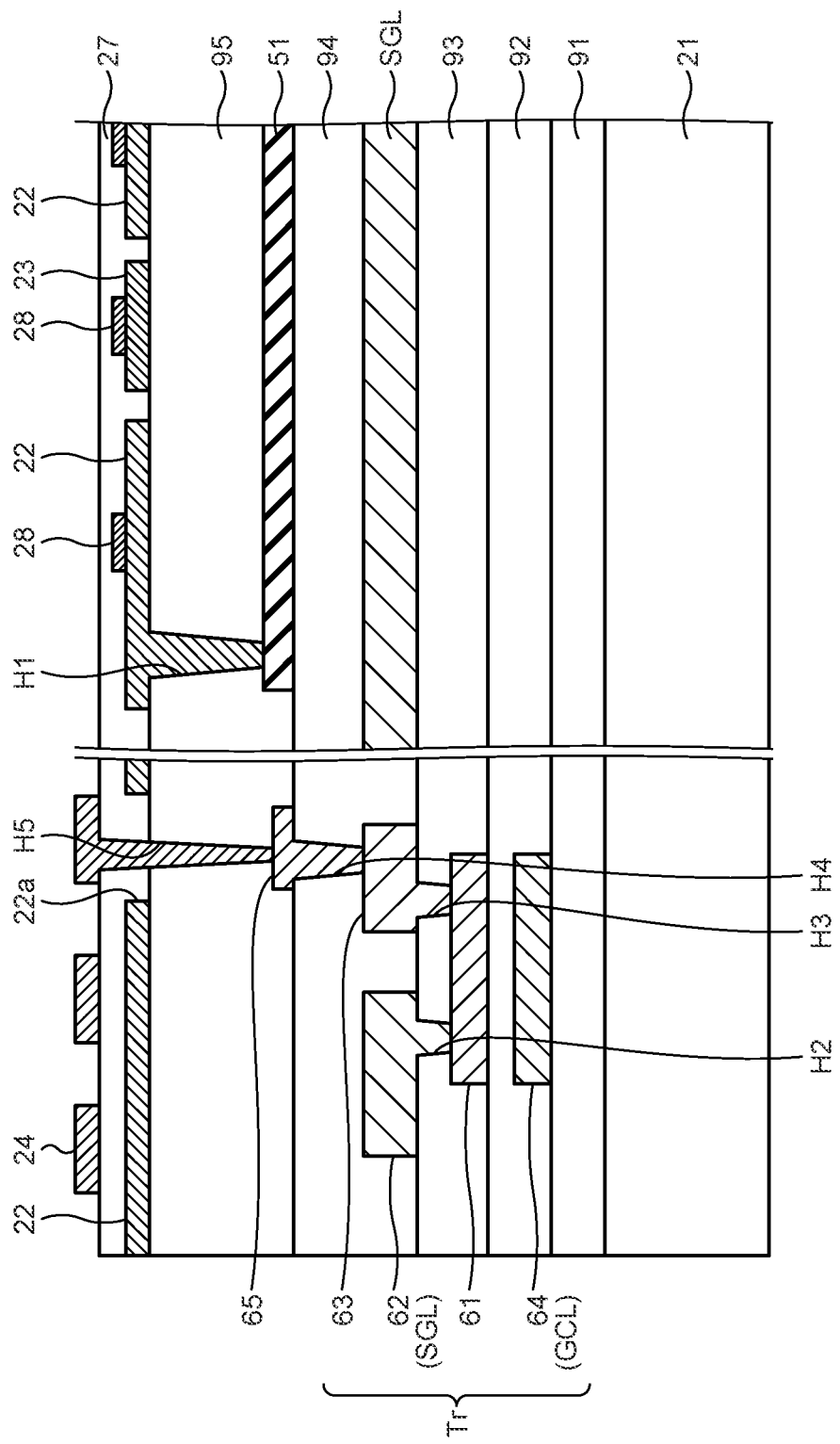
FIG. 9 is a IX-IX' sectional view of FIG. 8.

FIG. 8 is a plan view of the detection electrodes and the first electrodes according to the first embodiment. FIG. 9 is a IX-IX' sectional view of FIG. 8. FIG. 9 also illustrates a sectional configuration of the switching element Tr provided in the pixel Pix.

As illustrated in FIG. 8, the detection electrodes 22 each have a plurality of partial detection electrodes 22s. Individual detection electrode lines 51s are coupled to the respective partial detection electrodes 22s. The individual detection electrode lines 51s each extend in the second direction Dy and are adjacent to each other in the first direction Dx. The partial detection electrodes 22s included in one detection electrode 22 are electrically coupled to one common detection electrode line 51t via the individual detection electrode lines 51s coupled to the respective partial detection electrodes 22s.

The common detection electrode line 51t is coupled to the drive circuit 18 of the drive IC 19. Thus, in the second sensing period, the same second drive signal VSELF is supplied to the partial detection electrodes 22s electrically coupled to the common detection electrode line 51t. Signals corresponding to capacitance changes of the respective partial detection electrodes 22s are integrated via the common detection electrode line 51t, and the integrated signal is output to the second detection circuit 13. Thus, the partial detection electrodes 22s function as one detection electrode 22. During the display, the same display drive signal Vcomdc is supplied to each of the partial detection electrodes 22s.

In FIG. 8, one detection electrode 22 includes four partial detection electrodes 22s. One detection electrode 22 may have five or more partial detection electrodes 22s or have two or three partial detection electrodes 22s. The partial detection electrodes 22s adjacent to each other in the first direction Dx are separate from each other by a slit SL. The first electrodes 23 are each placed between the partial detection electrodes 22s adjacent to each other in the second direction Dy. The first electrodes 23 and the partial detection electrodes 22s are separate from each other by the slit SL. The pixel electrodes 24 are arranged in areas overlapping with the detection electrodes 22 and the first electrodes 23. FIG. 8 illustrates partial pixel electrodes in order for the drawing to be easily viewed.

With this configuration, the placement pitch of the first electrodes 23 in the second direction Dy is smaller than the placement pitch of the detection electrodes 22 in the second direction Dy. That is to say, in the display apparatus 1, the detection pitch of the electromagnetic induction touch detection can be smaller than the detection pitch of the capacitive touch detection.

A metallic line 28 is provided on the detection electrodes 22 and the first electrodes 23. The metallic line 28 provided on the first electrodes 23 extends in the first direction Dx. A plurality of metallic lines 28 provided on the partial detection electrodes 22s are arranged in the second direction Dy. The metallic lines 28 are provided for each of the partial detection electrodes 22s.

The metallic lines 28 are each a metallic material having higher conductivity than that of the detection electrodes 22 and the first electrodes 23. Thus, a total resistance value including the resistance of the detection electrodes 22 and the metallic lines 28 reduces, and a total resistance value including the resistance of the first electrodes 23 and the metallic lines 28 reduces. Thus, in the present embodiment, in either case of the electromagnetic induction touch detection and the self-capacitive touch detection, the responsiveness of the drive signal (the first drive signal VTP and the second drive signal VSELF) is increased, and detection sensitivity is improved.

As illustrated in FIG. 9, the switching element Tr includes a semiconductor 61, a source electrode 62, a drain electrode 63, and a gate electrode 64. The gate electrode 64 is provided on the first substrate 21 with a first insulating layer 91 therebetween. For the first insulating layer 91, a second insulating layer 92, a third insulating layer 93, and the insulating layer 27, an inorganic insulating material such as a silicon oxide film (SiO), a silicon nitride film (SiN), or a silicon oxide nitride film (SiON) is used. Each of the inorganic insulating layers is not limited to a single layer and may be a multi-layered film.

The second insulating layer 92, covering the gate electrode 64, is provided on the first insulating layer 91. The semiconductor 61 is provided on the second insulating layer 92. The gate electrode 64 is a portion of the gate line GCL overlapping with the semiconductor 61. The third insulating layer 93, covering the semiconductor 61, is provided on the second insulating layer 92. The gate electrode 64 is provided between the semiconductor 61 and the first substrate 21 in the direction perpendicular to the first substrate 21. A channel area is formed at a portion of the semiconductor 61 overlapping with the gate electrode 64.

In the example illustrated in FIG. 9, the switching element Tr has what is called a bottom gate structure. However, the switching element Tr may have a top gate structure, in which the gate electrode 64 is provided above the semiconductor 61. The switching element Tr may have a dual gate structure, in which gate electrodes 64 are provided with the semiconductor 61 therebetween in the direction perpendicular to the first substrate 21.

The semiconductor 61 is formed of amorphous silicon, a microcrystal oxide semiconductor, an amorphous oxide semiconductor, polycrystalline silicone, low temperature polycrystalline silicon (hereinafter, represented as LIPS), or gallium nitride (GaN), for example.

The source electrode 62 and the drain electrode 63 are provided on the third insulating layer 93. In the present embodiment, the source electrode 62 is electrically coupled to the semiconductor 61 via a contact hole H2. The drain electrode 63 is electrically coupled to the semiconductor 61 via a contact hole H3. The source electrode 62 is a part of the signal line SGL overlapping with the semiconductor 61.

A fourth insulating layer 94 and a fifth insulating layer 95, covering the source electrode 62 and the drain electrode 63, are provided on the third insulating layer 93. The fourth insulating layer 94 and the fifth insulating layer 95 are flattening layers that flatten irregularities formed by the switching elements Tr and the various kinds of wiring lines.

A relay electrode 65 and the detection electrode lines 51 are provided on the fourth insulating layer 94. The relay electrode 65 is electrically coupled to the drain electrode 63 via a contact hole H4. The detection electrode lines 51 are provided on the upper sides of the signal lines SGL. The detection electrodes 22 and the first electrodes 23 are provided on the fifth insulating layer 95. The first electrodes 23 are provided in the same layer as the detection electrodes 22. The detection electrode 22 is electrically coupled to the detection electrode line 51 via a contact hole H1. The metallic lines 28 are respectively provided on the detection electrodes 22 and first electrodes 23 to be in contact with the detection electrodes 22 and first electrodes 23.

Each of the pixel electrodes 24 is electrically coupled to the relay electrode 65 via the insulating layer 27 and a contact hole H5 provided in the fifth insulating layer 95. The contact hole H5 is formed at a position overlapping with an opening 22a of the detection electrodes 22. With this configuration, the pixel electrode 24 is coupled to the switching element Tr.

Figure 10:
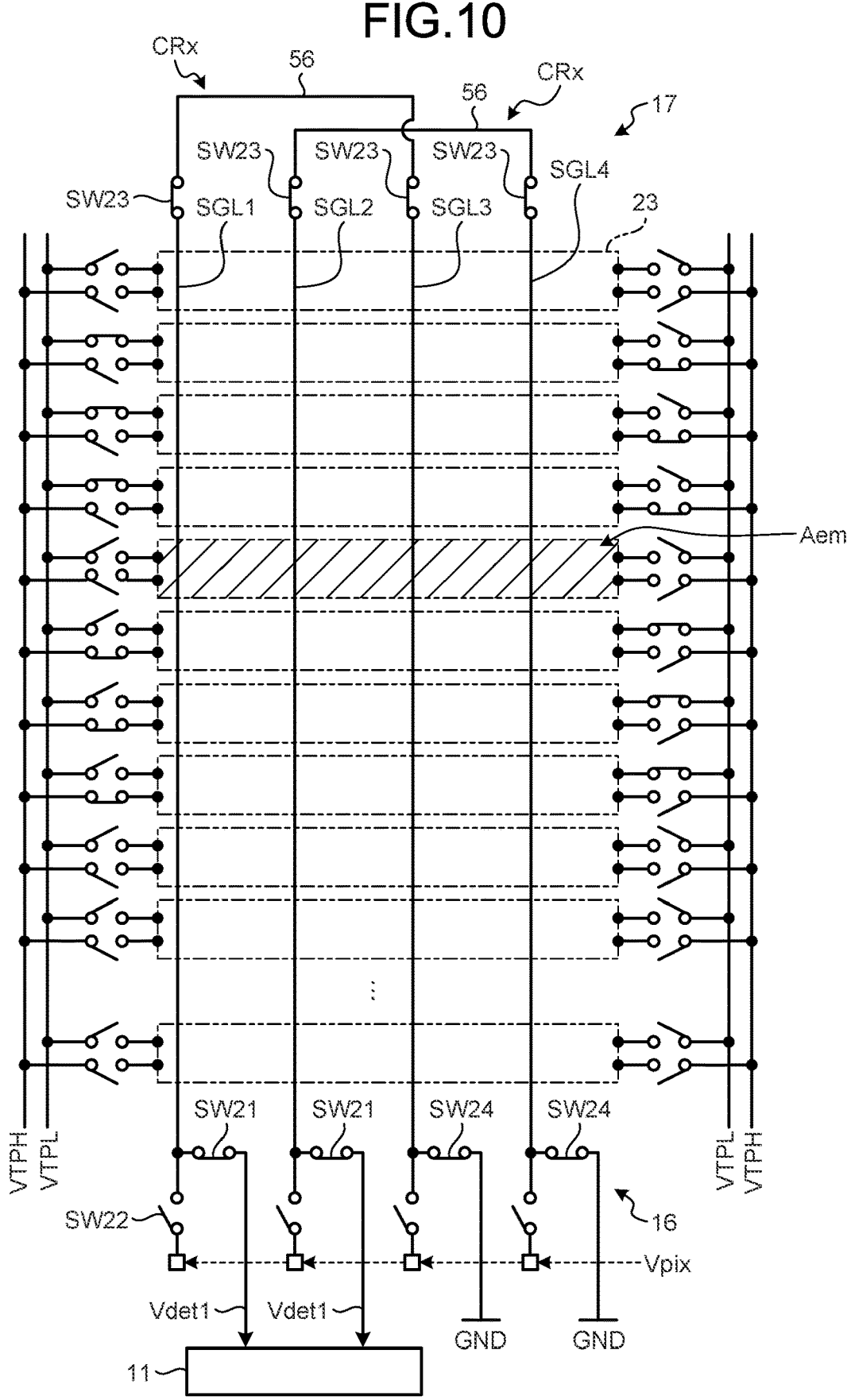
FIG. 10 is a circuit diagram of a coupling configuration of signal lines according to the first embodiment.

FIG. 10 is a circuit diagram of a coupling configuration of the signal lines according to the first embodiment. FIG. 10 illustrates four signal lines SGL1, SGL2, SGL3, and SGL4 among the signal lines SGL. In the following description, when there is no need to distinguish the signal lines SGL1, SGL2, SGL3, and SGL4 from each other, they are represented as a signal line SGL. FIG. 10 illustrates the first electrode 23 by two-dotted dashed lines.

As illustrated in FIG. 10, the signal line SGL is provided crossing the first electrodes 23 in a plan view. The first coupling switching circuit 16 is provided on one end side of each of the signal lines SGL1, SGL2, SGL3, and SGL4, whereas the second coupling switching circuit 17 is provided on the other end side thereof. The first coupling switching circuit 16 is a switching circuit including switches SW21, SW22, and SW24. The second coupling switching circuit 17 is a switching circuit including switches SW23 and signal line coupling lines 56. In the following description, with reference to FIG. 10, the one end of the signal line SGL is represented as a lower end, whereas the other end thereof is represented as an upper end.

In the first coupling switching circuit 16, the switches SW21 switch between coupling and uncoupling the signal lines SGL1 and SGL2 and the first detection circuit 11. The switches SW22 switch between coupling and uncoupling the signal lines SGL and the display control circuit 14. The switches SW24 switch between coupling and uncoupling the signal lines SGL3 and SGL4 and a reference potential (a ground potential GND, for example).

In the second coupling switching circuit 17, the switches SW23 and the signal line coupling line 56 switch between coupling and uncoupling the upper ends of the signal lines SGL1 and SGL3 that are paired with each other. The switches SW23 and the signal line coupling line 56 switch between coupling and uncoupling the upper ends of the signal lines SGL2 and SGL4 that are paired with each other.

In the first sensing period, the switches SW23 are turned on in accordance with the control signal from the first detection control circuit 10. Thus, the upper ends of the signal lines SGL1 and SGL3, which are paired with each other, are coupled to each other via the signal line coupling line 56. Similarly, the upper ends of the signal lines SGL2 and SGL4, which are paired with each other, are coupled to each other via the signal line coupling line 56. On the lower end sides of the signal lines SGL, the switches SW22 are turned off, whereas the switches SW21 and SW24 are turned on. Thus, the lower ends of the signal line SGL1 and the signal line SGL2 are each coupled to the first detection circuit 11. The lower ends of the signal line SGL3 and the signal line SGL4 are coupled to the reference potential (the ground potential GND, for example).

With this configuration, the signal lines SGL1 and SGL3, which are paired with each other, are coupled to each other so as to form a loop as a reception coil CRx. The signal lines SGL2 and SGL4, which are paired with each other, are coupled to each other so as to form a loop as the reception coil CRx. The reception coils CRx are provided overlapping with the detection area Aem formed with the first electrodes 23. The reception coils CRx may be formed by a signal line block including a plurality of signal lines SGL like the transmission coils CTx illustrated in FIG. 8.

When the magnetic field M2 from the touch pen 100 (refer to FIG. 2) has passed through an area surrounded by the pair of the signal lines SGL1 and SGL3 and the signal line coupling line 56 or an area surrounded by the pair of the signal lines SGL2 and SGL4 and the signal line coupling line 56, an electromotive force corresponding to a change in the magnetic field M2 is generated in each of the reception coils CRx. The first detection signal Vdet1 corresponding to this electromotive force is supplied to the first detection circuit 11. Thus, in the first sensing period, the first drive signal VTP is supplied to the first electrodes 23 from the drive circuit 18 to generate a magnetic field, and an electromotive force due to the magnetic field is generated in the signal lines SGL. Thus, the display apparatus 1 can detect the touch pen 100.

In the present embodiment, the reception coils CRx adjacent to each other are placed partially overlapping with each other. Specifically, in the area surrounded by the pair of the signal lines SGL1 and SGL3 and the signal line coupling line 56 forming one reception coil CRx, the signal line SGL2 of the other reception coil CRx is placed. In the area surrounded by the pair of the signal lines SGL2 and SGL4 and the signal line coupling line 56 forming the other reception coil CRx, the signal line SGL3 of the one reception coil CRx is placed. This configuration can restrain generation of an area in the display area AA in which the detection sensitivity of a magnetic field decreases or an insensitive area in the display area AA in which a magnetic field cannot be detected.

In the display period, the switches SW23 are turned off in accordance with the control signal from the first detection control circuit 10. Thus, the upper ends of the signal lines SGL1, SGL2, SGL3, and SGL4 are not coupled to each other. The switches SW21 and SW24 are turned off, whereas the switches SW22 are turned on. Thus, the lower ends of the signal lines SGL1, SGL2, SGL3, and SGL4 are not coupled to the first detection circuit 11 nor the ground potential GND. The pixel signals Vpix are supplied to the signal lines SGL via the switches SW22.

In the second sensing period, the second detection control circuit 12 may supply the guard drive signal to the signal lines SGL. Alternatively, the second detection control circuit 12 may bring the signal lines SGL into a floating state.

Modification of First Embodiment

Figure 11:
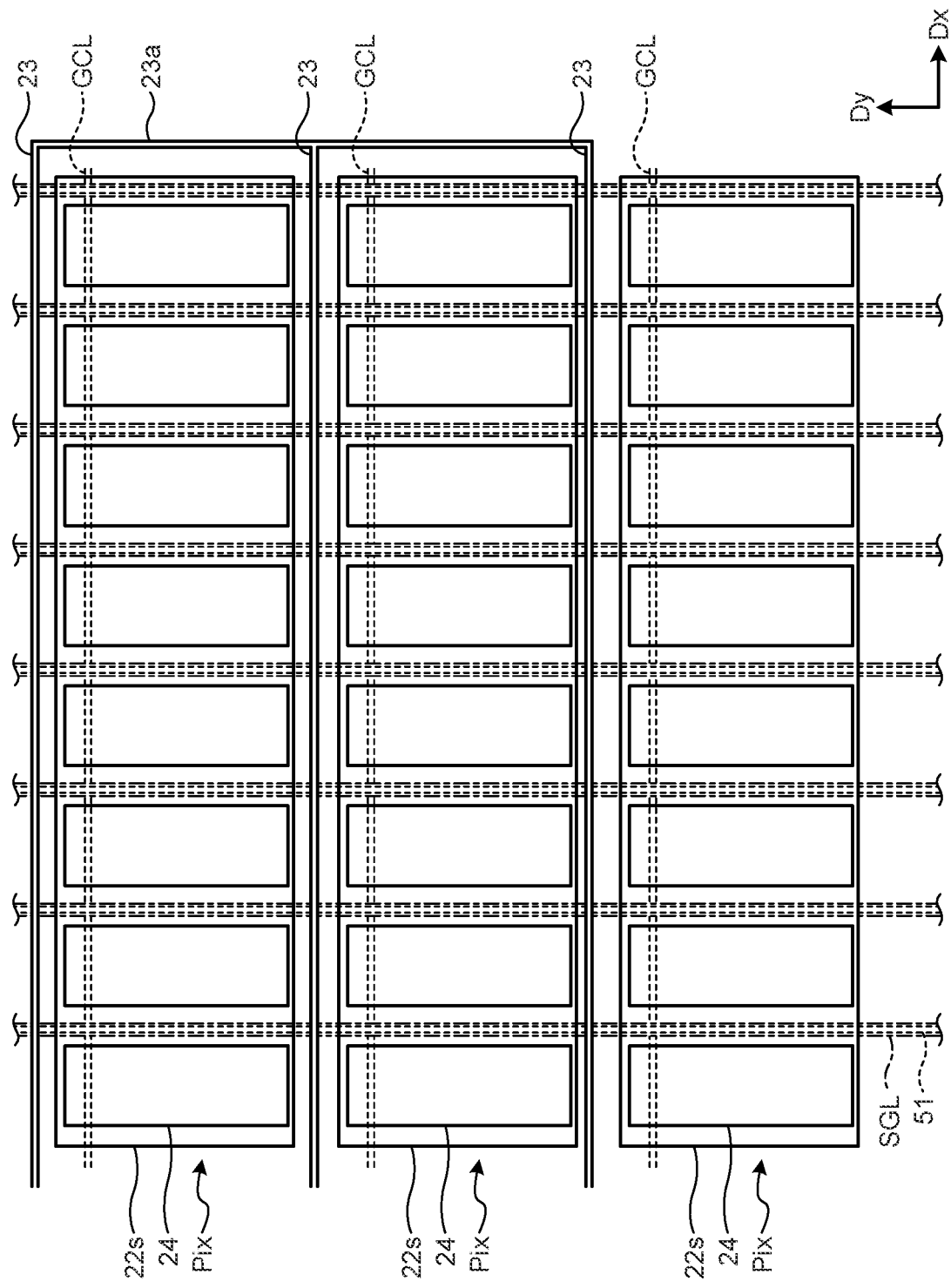
FIG. 11 is a plan view of the detection electrodes and the first electrodes according to a modification of the first embodiment.

FIG. 11 is a plan view of the detection electrodes and the first electrodes according to a modification of the first embodiment. In the present modification, the partial detection electrodes 22s are sectioned for each of the pixels Pix arranged in the second direction Dy. The first electrodes 23 are each provided between the partial detection electrodes 22s adjacent to each other in the second direction Dy and extend in the first direction Dx along the partial detection electrodes 22s. The metallic lines 28 are provided on the respective first electrodes 23.

The right ends of the first electrodes 23 are coupled to each other by a first electrode coupling line 23a. The first electrodes 23 coupled to each other by the first electrode coupling line 23a are coupled to the first drive signal supply lines 52 and 53 and the second drive signal supply lines 54 and 55 to form the transmission coils CTx. Four or more first electrodes 23 may be coupled to one first electrode coupling line 23a.

The partial detection electrodes 22s and the first electrodes 23 are sectioned for each of the pixels Pix arranged in the second direction Dy, and thus the display apparatus 1 can increase the resolution of the self-capacitive touch detection and the electromagnetic induction touch detection.

Second Embodiment

Figure 12:
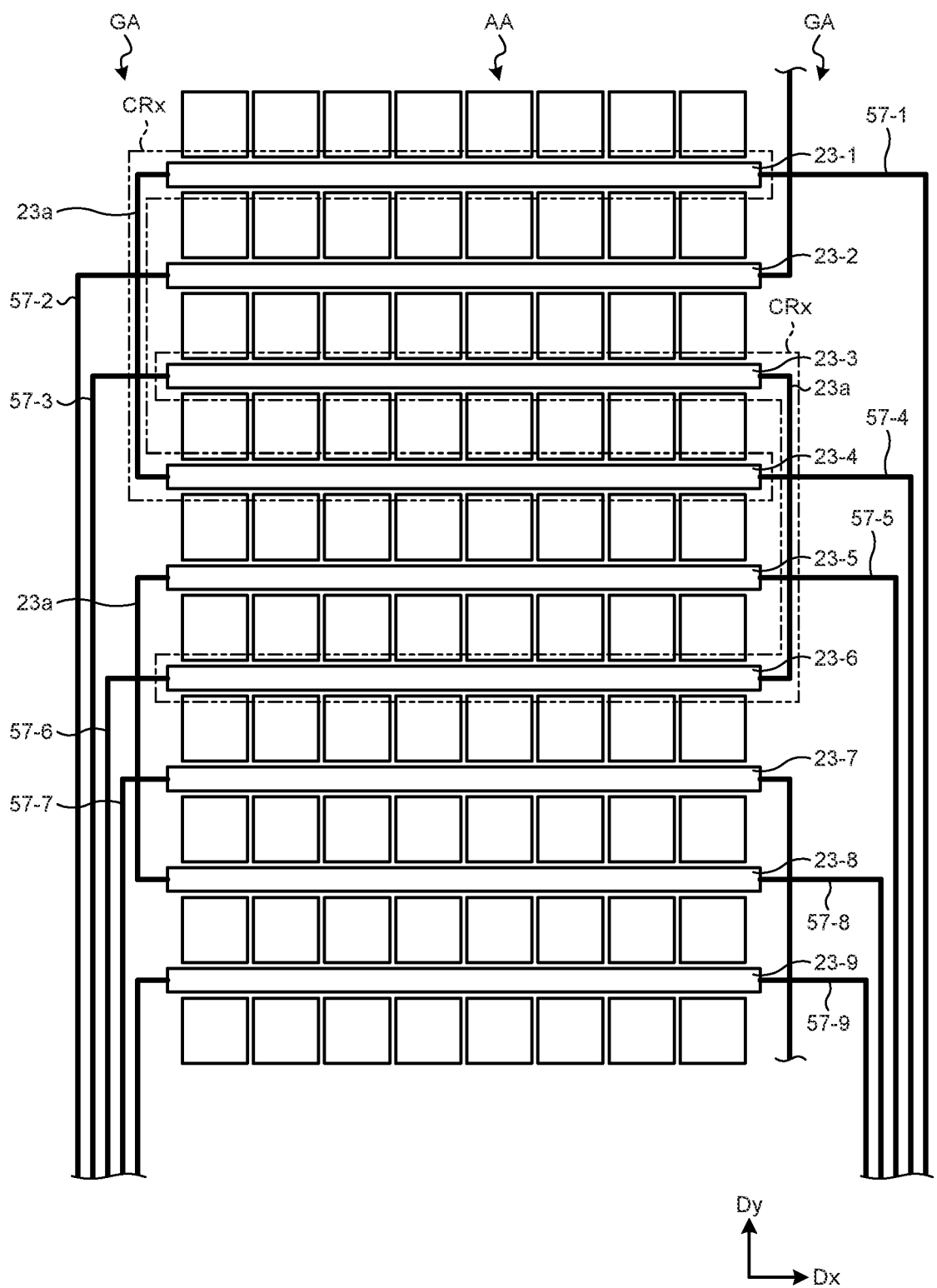
FIG. 12 is a circuit diagram of a coupling configuration of the first electrodes according to a second embodiment.
Figure 13:
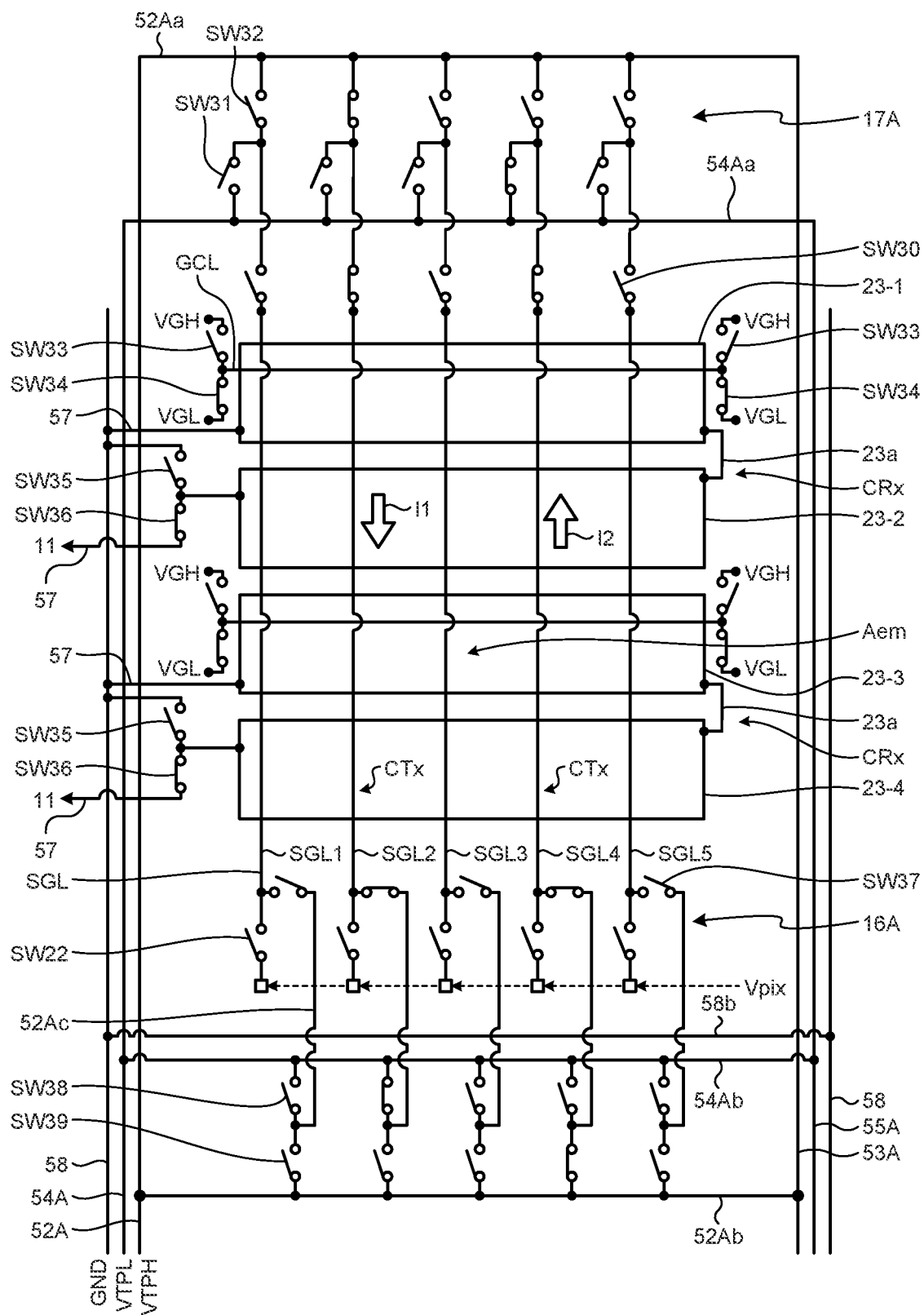
FIG. 13 is a circuit diagram of a coupling configuration of the signal lines according to the second embodiment.

FIG. 12 is a circuit diagram of a coupling configuration of the first electrodes according to a second embodiment. FIG. 13 is a circuit diagram of a coupling configuration of the signal lines according to the second embodiment. In the following description, the components described in the embodiment described above are denoted by the same symbols, and a description thereof is omitted.

In the present embodiment, in the first sensing period, the first drive signal VTP is supplied to the signal lines SGL from the drive circuit 18 to generate a magnetic field, and an electromotive force due to the magnetic field is generated in the first electrodes 23.

Specifically, as illustrated in FIG. 12, the left end of the first electrode 23-1 and the left end of the first electrode 23-4 are coupled to each other by the first electrode coupling line 23a provided in the peripheral area GA. Detection signal output lines 57-1 and 57-4 are coupled to the right end of the first electrode 23-1 and the right end of the first electrode 23-4, respectively. The detection signal output lines 57-1 and 57-4 are coupled to the first detection circuit 11. Thus, the first electrode 23-1, the first electrode 23-4, and the first electrode coupling line 23a form the reception coil CRx.

Similarly, the right end of the first electrode 23-3 and the right end of the first electrode 23-6 are coupled to each other by the first electrode coupling line 23a provided in the peripheral area GA. Detection signal output lines 57-3 and 57-6 are coupled to the left end of the first electrode 23-3 and the left end of the first electrode 23-6, respectively. The detection signal output lines 57-3 and 57-6 are coupled to the first detection circuit 11. Thus, the first electrode 23-3, the first electrode 23-6, and the first electrode coupling line 23a form the reception coil CRx. The first electrode 23-5, the first electrode 23-8, and the first electrode coupling line 23a form the reception coil CRx.

Also in the present embodiment, the reception coils CRx adjacent to each other are placed partially overlapping with each other. Specifically, in an area surrounded by a pair of the first electrodes 23-1 and the first electrode 23-4 and the first electrode coupling line 23a forming one reception coil CRx, the first electrode 23-3 of the other reception coil CRx is placed. In an area surrounded by a pair of the first electrode 23-3 and the first electrode 23-6 and the first electrode coupling line 23a forming the other reception coil CRx, the first electrode 23-4 of the one reception coil CRx is placed.

As illustrated in FIG. 13, a second coupling switching circuit 17A includes switches SW30, SW31, and SW32. The switch SW30 is provided on the upper end side of the signal line SGL and is provided between the upper end of the signal line SGL and both a coupling line 52Aa and a coupling line 54Aa. The coupling line 52Aa is provided on the upper end sides of the signal lines SGL and couples a first drive signal supply line 52A and a first drive signal supply line 53A to each other. The coupling line 54Aa is provided on the upper end sides of the signal lines SGL and couples a second drive signal supply line 54A and a second drive signal supply line 55A to each other. The second coupling switching circuit 17A switches, based on the switching signal Vss from the first detection control circuit 10, the signal lines SGL to which the first drive signal VTP is supplied from the first detection control circuit 10 in place of switching coupling between the signal lines SGL.

The switch SW31 is provided between the coupling line 54Aa and the upper end of the signal line SGL. The switch SW32 is provided between the coupling line 52Aa and the upper end of the signal line SGL.

A first coupling switching circuit 16A includes switches SW22, SW37, SW38, and SW39. The switches SW22 are coupled to the display control circuit 14, and the pixel signals Vpix are supplied thereto. The switch SW37 is provided between the lower end of the signal line SGL and a coupling line 52Ac. The switch SW38 is provided between a coupling line 54Ab and the coupling line 52Ac (the signal line SGL). The coupling line 54Ab is provided on the lower end sides of the signal lines SGL and couples the first drive signal supply line 52A and the first drive signal supply line 53A to each other. The switch SW39 is provided between a coupling line 52Ab and the coupling line 52Ac (the signal line SGL). The coupling line 52Ab is provided on the lower end sides of the signal lines SGL to couple the second drive signal supply line 54A and the second drive signal supply line 55A to each other. The first coupling switching circuit 16A switches the signal lines SGL to which the first drive signal VTP is supplied from the first detection control circuit 10 in place of supplying the first detection signals Vdet1 from the signal lines SGL to the first detection circuit 11.

A high level voltage VGH of the scanning signal Vscan (refer to FIG. 1) is supplied to the gate lines GCL via switches SW33. A low level voltage VGL of the scanning signal Vscan is supplied to the gate lines GCL via switches SW34.

FIG. 13 illustrates four first electrodes 23-1, 23-2, 23-3, and 23-4 in order for the drawing to be easily viewed. The left end of the first electrode 23-1 is coupled to a third drive signal supply line 58 via a detection signal output line 57. The right ends at the same side of the first electrode 23-1 and the first electrode 23-2 are coupled to each other via the first electrode coupling line 23a. The left end of the first electrode 23-2 is coupled to the third drive signal supply line 58 via a switch SW35, or the left end of the first electrode 23-2 is coupled to the first detection circuit 11 via a switch SW36. The first electrode 23-3 and the first electrode 23-4, which are paired with each other, are also coupled to each other so as to form a loop.

In the first sensing period, the switches SW22 are turned off, whereas the switches SW37 and the switches SW30 are turned on in accordance with the control signal from the first detection control circuit 10. Thus, the signal lines SGL are coupled to the supply circuits illustrated in FIG. 7 via the first drive signal supply lines 52A and 53A and the second drive signal supply lines 54A and 55A.

Specifically, FIG. 13 illustrates a case in which the signal line SGL2 and the signal line SGL4 form the transmission coil CTx. An area between the signal line SGL2 and the signal line SGL4 is the detection area Aem. The switches SW30 that are respectively coupled to the upper end side of the signal line SGL2 and the upper end side of the signal line SGL4, are each turned on. The switches SW37 that are respectively coupled to the lower end side of the signal line SGL2 and the lower end side of the signal line SGL4, are each turned off.

On the upper end side of the signal line SGL2, a switch SW31 is turned off, whereas a switch SW32 is turned on. Thus, the upper end of the signal line SGL2 is electrically coupled to the first drive signal supply lines 52A and 53A via the coupling line 52Aa. On the lower end side of the signal line SGL2, a switch SW38 is turned on, whereas a switch SW39 is turned off. Thus, the lower end of the signal line SGL2 is electrically coupled to the second drive signal supply lines 54A and 55A via the coupling line 54Ab.

On the upper end side of the signal line SGL4, the switch SW31 is turned on, whereas the switch SW32 is turned off. Thus, the upper end of the signal line SGL4 is electrically coupled to the second drive signal supply lines 54A and 55A via the coupling line 54Aa. On the lower end side of the signal line SGL4, the switch SW38 is turned off, whereas the switch SW39 is turned on. Thus, the lower end of the signal line SGL4 is electrically coupled to the first drive signal supply lines 52A and 53A via the coupling line 52Ab.

The first voltage supply circuit 18C (refer to FIG. 7) supplies the first voltage VTPH to the upper end of the signal line SGL2 via the first drive signal supply lines 52A and 53A. The second voltage supply circuit 18D (refer to FIG. 7) supplies the second voltage VTPL to the lower end of the signal line SGL2 via the second drive signal supply lines 54A and 55A. Thus, a potential difference is generated between the upper end and the lower end of the signal line SGL2, and the current I1 flows in a direction from the upper end toward the lower end.

The first voltage supply circuit 18C supplies the first voltage VTPH to the lower end of the signal line SGL4 via the first drive signal supply lines 52A and 53A. The second voltage supply circuit 18D supplies the second voltage VTPL to the upper end of the signal line SGL4 via the second drive signal supply lines 54A and 55A. Thus, a potential difference is generated between the upper end and the lower end of the signal line SGL4, and the current I2 flows in a direction from the lower end toward the upper end.

In the present embodiment, the operations of the switches SW31, SW32, SW38, and SW39 are switched, whereby the first voltage VTPH and the second voltage VTPL to be supplied to both ends of the signal lines SGL are changed at a certain frequency. Thus, the first drive signal VTP as an AC voltage signal is supplied to the signal lines SGL.

The currents I1 and I2 passing through the signal lines SGL generate magnetic fields to cause electromagnetic induction. In the example illustrated in FIG. 13, the signal line SGL2 and the signal line SGL4 correspond to the transmission coil CTx. The first detection control circuit 10 sequentially selects the signal lines SGL. Thus, touch detection for the entire display area AA is performed by the electromagnetic induction method. In FIG. 13, the two signal lines SGL form the transmission coil CTx. However, this is not limiting; the transmission coil CTx may be formed by two or more signal lines SGL (a signal line block) placed on one side of the detection area Aem and two or more signal lines SGL (a signal line block) placed on the other side thereof. A configuration can also be employed in which the number of the signal lines is not the same between the two sides, that is, the number of signal lines SGL on one side is different from the number of signal lines SGL on the other side.

The reference potential (the ground potential GND) is supplied to the third drive signal supply line 58. The reference potential (the ground potential GND) is supplied to the left end of the first electrode 23-1 and the left end of the first electrode 23-3 coupled to the third drive signal supply line 58. Switches SW35 coupled to the respective left ends of the first electrode 23-2 and the first electrode 23-4 are turned off, whereas switches SW36 are turned on. Thus, the left end of the first electrode 23-2 and the left end of the first electrode 23-4 are coupled to the first detection circuit 11. Electromotive force based on electromagnetic induction is generated in the reception coils CRx formed by the first electrodes 23. A current corresponding to this electromotive force (the first detection signal Vdet1) is supplied to the first detection circuit 11.

The switches SW30, SW31, and SW32 coupled to the upper end sides of the signal lines SGL1, SGL3, and SGL5 are turned off, whereas the switches SW22, SW37, SW38, and SW39 coupled to the lower end sides thereof are turned off. Thus, the ground potential GND, the first voltage VTPH, and the second voltage VTPL are not supplied to the signal lines SGL1, SGL3, and SGL5, whereby the signal lines are made to be in a floating state.

In a period different from the first sensing period (the display period and the second sensing period), the signal lines SGL are made to be uncoupled to each other by the operation of the switches.

The detection electrodes 22 are formed of ITO, whereas the signal lines SGL are formed of metal. Thus, the signal lines SGL have extremely lower resistance than that of the detection electrodes 22. Thus, it is possible, by using the signal lines SGL as the drive electrodes (the transmission coils CTx), to hamper the first drive signal VTP as an AC rectangular wave from being rounded. Thus, the display apparatus 1 increases the responsiveness of the drive signal and improves detection sensitivity.

Third Embodiment

Figure 14:
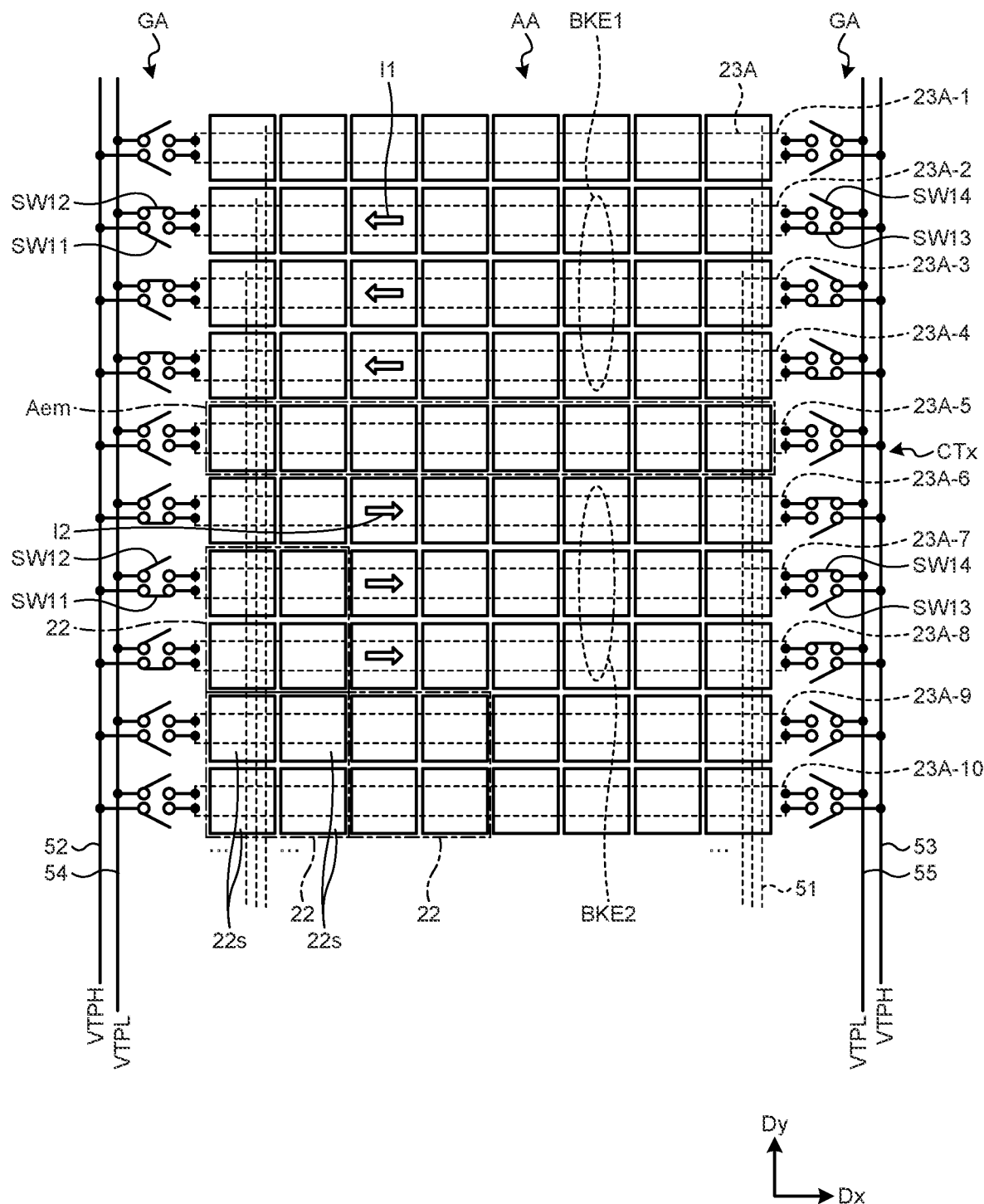
FIG. 14 is a circuit diagram of a coupling configuration of the first electrodes according to a third embodiment.
Figure 15:
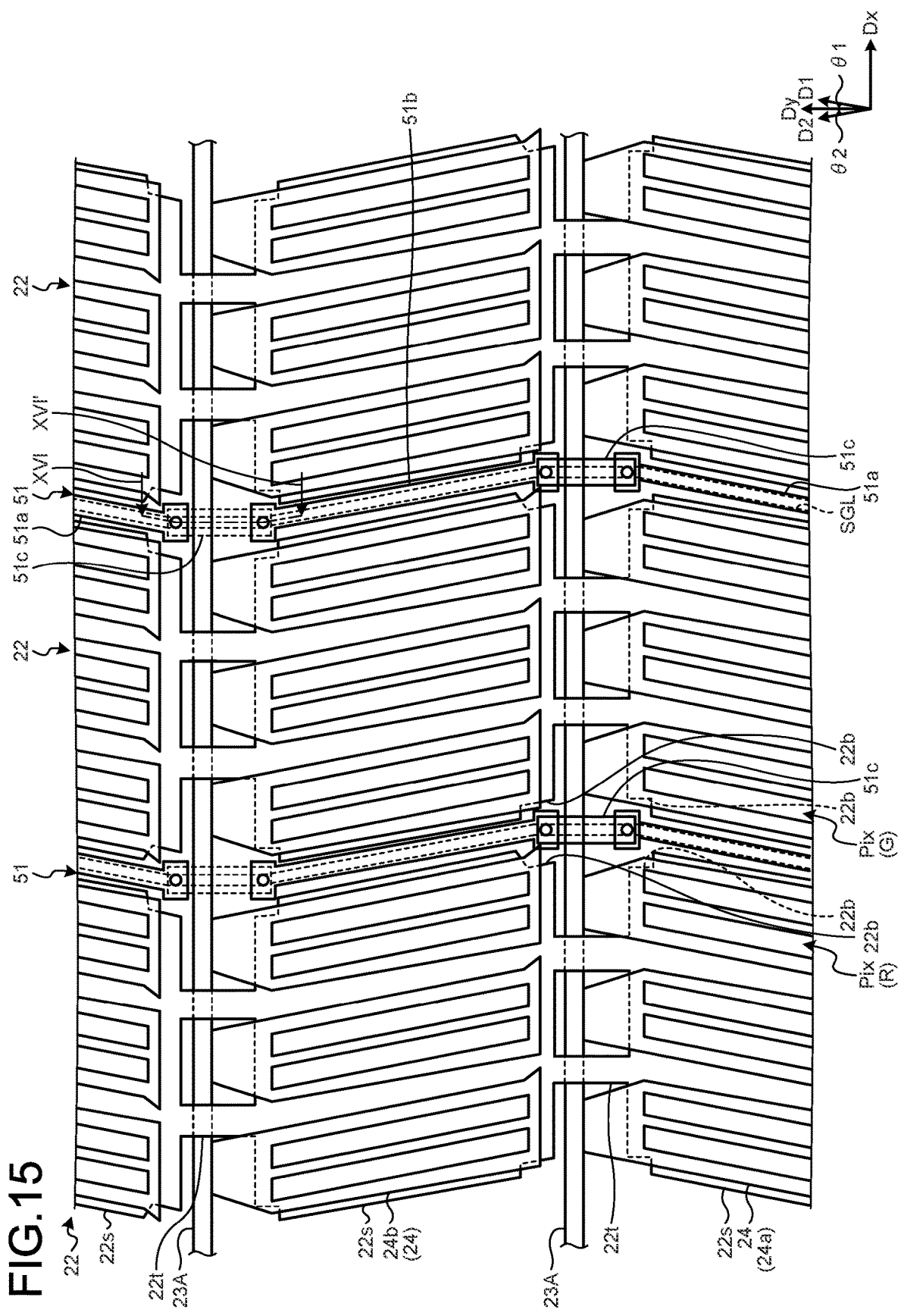
FIG. 15 is a plan view of the first electrodes, the detection electrodes, and detection electrode lines according to the third embodiment.
Figure 16:
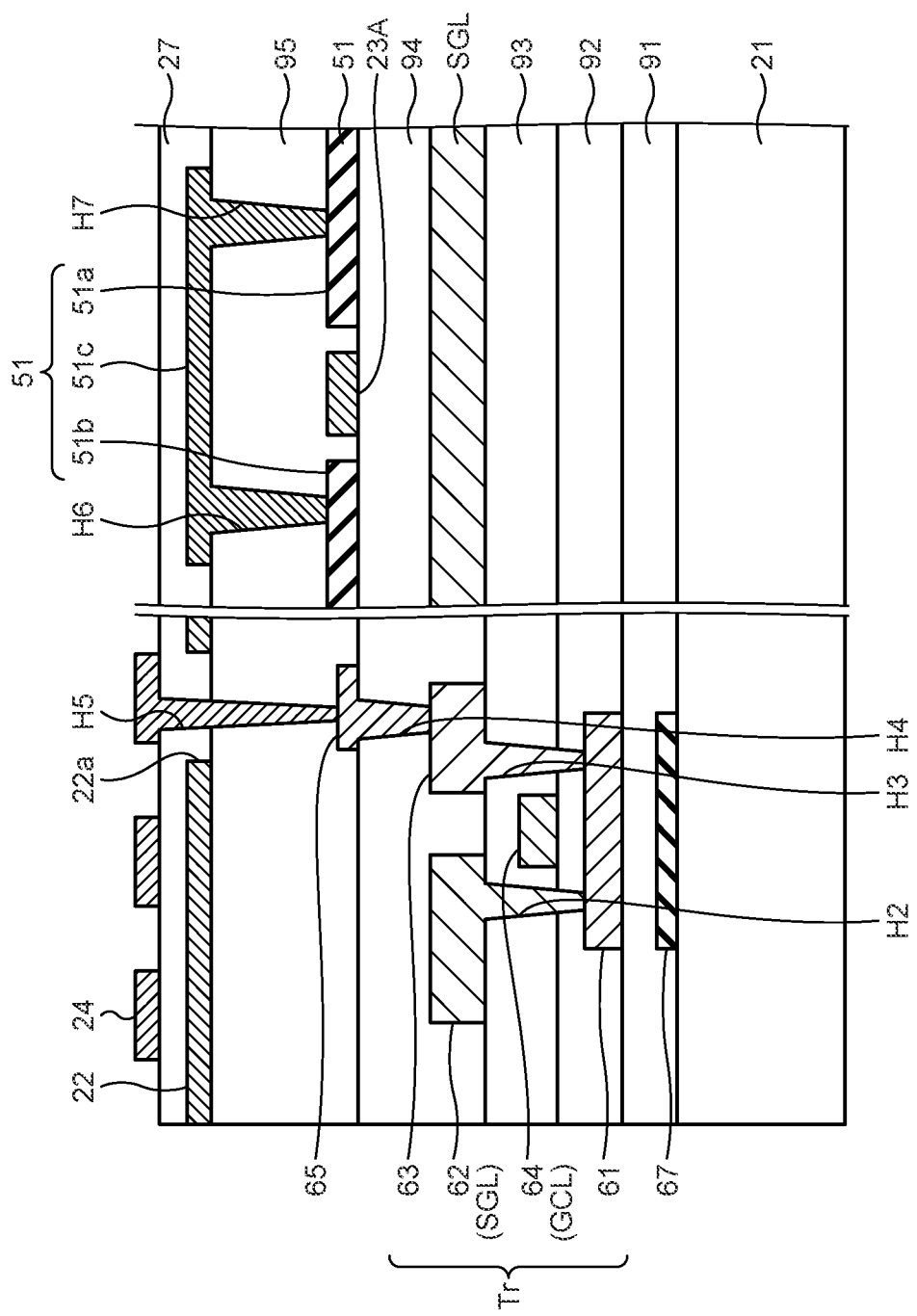
FIG. 16 is a XVI-XVI' sectional view of FIG. 15.

FIG. 14 is a circuit diagram of a coupling configuration of the first electrodes according to a third embodiment. FIG. 15 is a plan view of the first electrodes, the detection electrodes, and the detection electrode lines according to the third embodiment. FIG. 16 is a XVI-XVI' sectional view of FIG. 15. FIG. 16 also illustrates a sectional configuration of the switching element Tr of the pixel Pix.

In the present embodiment, first electrodes 23A are provided in the same layer as the detection electrode lines 51. In other words, the first electrodes 23A are provided in a different layer from the detection electrodes 22. As illustrated in FIG. 14, the first electrodes 23A each extend in the first direction Dx and are arranged in the second direction Dy. The first electrodes 23A are provided at positions overlapping with the detection electrodes 22 and cross the detection electrode lines 51 in a plan view. In the present embodiment, like FIG. 6 and FIG. 10 illustrated in the first embodiment, the first electrodes 23A form the transmission coils CTx, whereas the signal lines SGL form the reception coils CRx.

As illustrated in FIG. 15, the pixel electrodes 24 each include a first pixel electrode 24a and a second pixel electrode 24b. The first pixel electrode 24a is inclined along a direction D1. The second pixel electrode 24b is inclined along a direction D2. The first pixel electrode 24a and the second pixel electrode 24b are alternately arranged in the second direction Dy.

The signal line SGL is provided along the first pixel electrode 24a and the second pixel electrode 24b. In the signal line SGL, a portion inclined along the direction D1 and a portion inclined along the direction D2 are alternately coupled to each other in the second direction Dy. The signal line SGL as a whole extends in the second direction Dy.

The direction D1 is a direction inclined by an angle θ1 with respect to the second direction Dy. The direction D2 is a direction inclined by an angle θ2 with respect to the second direction Dy. In the present embodiment, the angle θ1 is equal to the angle θ2. In other words, the direction D2 is a direction inclined to a side opposite to a side to which the direction D1 is inclined with respect to the second direction Dy. The angle θ1 may be different from the angle θ2.

The first electrodes 23A are each placed between the first pixel electrode 24a and the second pixel electrode 24b adjacent to each other in the second direction Dy and extend in the first direction Dx.

The partial detection electrodes 22s are each provided in an area overlapping with three pixel electrodes 24 and are arranged in the first direction Dx and the second direction Dy. The partial detection electrodes 22s adjacent to each other in the second direction Dy are coupled to each other by a coupling part 22t. The coupling part 22t is provided between the pixel electrodes 24 adjacent to each other in the first direction Dx and crosses the first electrode 23A in a plan view.

A detection electrode line 51 includes a first partial detection electrode line 51a, a second partial detection electrode line 51b, and a bridge line 51c. The first partial detection electrode line 51a is provided along the direction D1 and is provided between first pixel electrodes 24a adjacent to each other in the first direction Dx. The second partial detection electrode line 51b is provided along the direction D2 and is provided between second pixel electrodes 24b adjacent to each other in the first direction Dx. The first partial detection electrode line 51a and the second partial detection electrode line 51b are arranged adjacent to each other in the second direction Dy with the first electrode 23A therebetween. The first partial detection electrode line 51a and the second partial detection electrode line 51b are provided overlapping with the signal line SGL.

The bridge line 51c is provided in a different layer from the first partial detection electrode line 51a and the second partial detection electrode line 51b and couples the first partial detection electrode line 51a and the second partial detection electrode line 51b to each other. The bridge line 51c crosses the first electrode 23A in a plan view. A notch 22b is formed at a corner part of a partial detection electrode 22s. The bridge line 51c is provided in an opening formed by notches 22b of four partial detection electrodes 22s.

The bridge line 51c is preferably provided between the pixel Pix displaying red (R) and the pixel Pix displaying green (G). This configuration can reduce a decrease in the aperture ratio of the pixel Pix displaying blue (B), which has low luminance.

As illustrated in FIG. 16, the semiconductor 61 of the switching element Tr is provided on the first insulating layer 91. The gate electrode 64 is provided on the semiconductor 61 with the second insulating layer 92 therebetween. The switching element Tr of the present embodiment has what is called a top gate structure. A second electrode 67 is provided between the first substrate 21 and the semiconductor 61 in the direction perpendicular to the first substrate 21. The second electrode 67 is formed of a material having light transmittance lower than that of the first substrate 21 and is used as a light shielding layer. The second electrode 67 is formed of a metallic material, for example. In the present embodiment, the switching element Tr may has the bottom gate structure like FIG. 9 or the dual gate structure.

The first partial detection electrode line 51a, the second partial detection electrode line 51b, and the first electrode 23A are provided on the fourth insulating layer 94. The bridge line 51c, extending over the first electrode 23A, is provided on the fifth insulating layer 95. The bridge line 51c is coupled to the second partial detection electrode line 51b via a contact hole H6 and is coupled to the first partial detection electrode line 51a via a contact hole H7. The bridge line 51c is provided in the same layer as the detection electrodes 22. The bridge line 51c is formed of, for example, a translucent conductive material such as ITO like the detection electrode 22.

In the present embodiment, the first electrodes 23A are provided in the same layer as the detection electrode lines 51 coupled to the detection electrodes 22. More specifically, the first electrodes 23A are provided in a different layer from the detection electrodes 22 and in the same layer as the first partial detection electrode line 51a and the second partial detection electrode line 51b. Thus, the first electrodes 23A can be formed of the same metallic material as that of the detection electrode lines 51. Consequently, the transmission coils CTx are formed of the first electrodes 23A having favorable conductivity, whereby the display apparatus 1 can increase the responsiveness of the drive signal.

Modification of Third Embodiment

Figure 17:
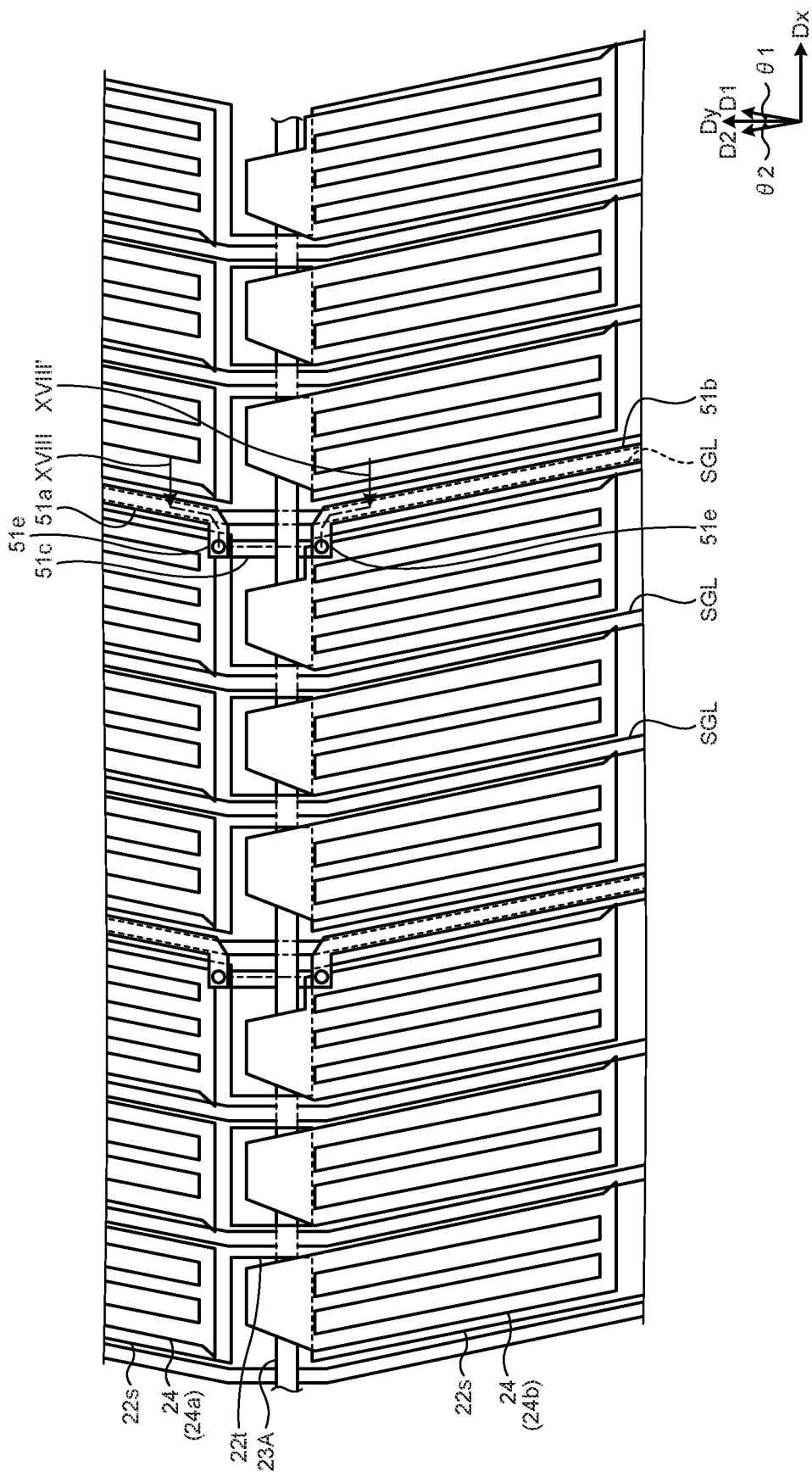
FIG. 17 is a plan view of the first electrodes, the detection electrodes, and the detection electrode lines according to a modification of the third embodiment.
Figure 18:
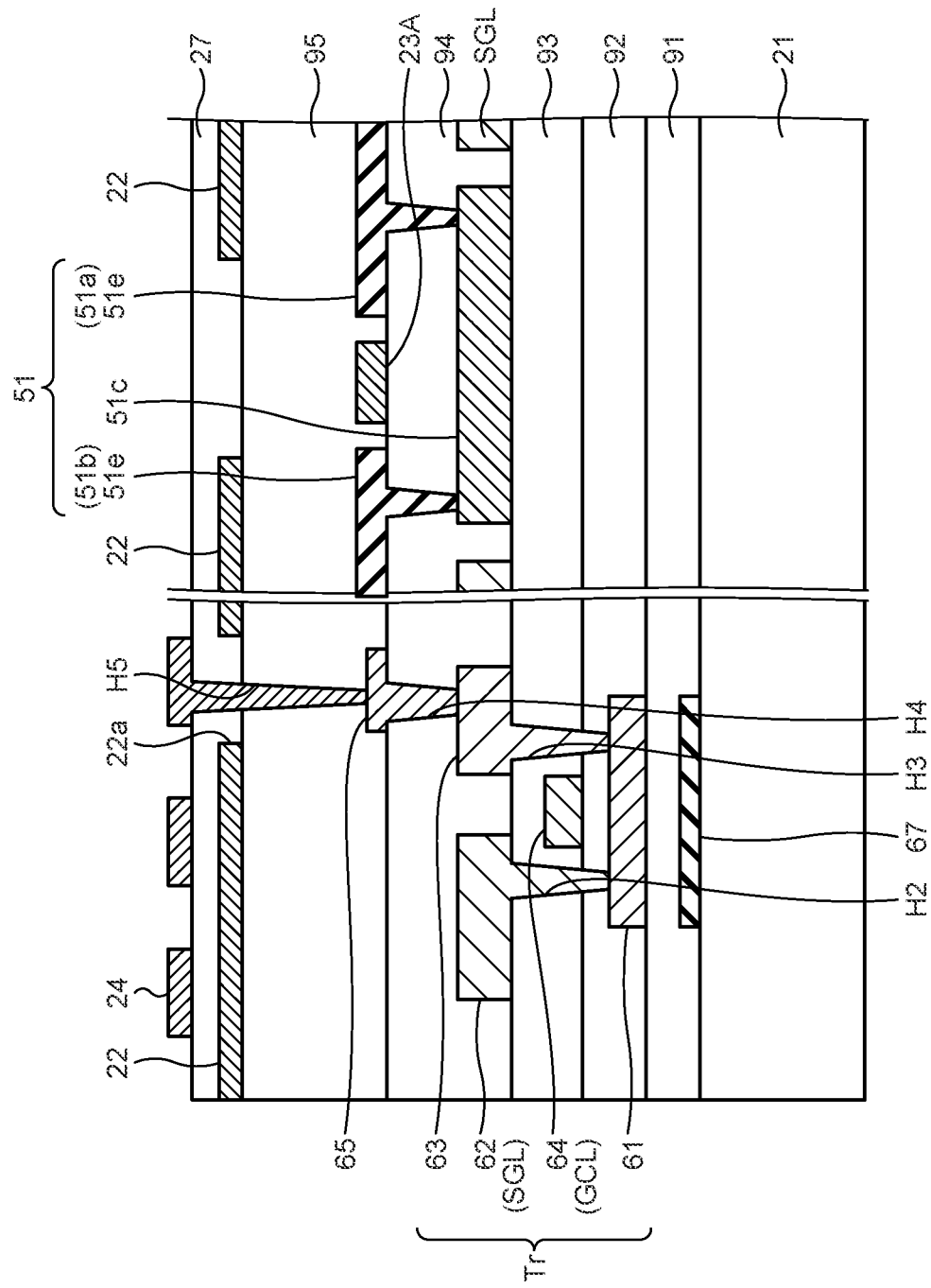
FIG. 18 is a XVIII-XVIII' sectional view of FIG. 17.

FIG. 17 is a plan view of the first electrodes, the detection electrodes, and the detection electrode lines according to a modification of the third embodiment. FIG. 18 is a XVIII-XVIII' sectional view of FIG. 17. As illustrated in FIG. 17, coupling parts 51e are respectively provided at the end of the first partial detection electrode line 51a and the end of the second partial detection electrode line 51b. The coupling parts 51e bend from the first partial detection electrode line 51a and the second partial detection electrode line 51b, respectively, and extend in a direction along the first electrode 23A. The coupling parts 51e extend to positions not overlapping with the signal line SGL and are coupled to the bridge line 51c. The bridge line 51c couples the coupling part 51e of the first partial detection electrode line 51a and the coupling part 51e of the second partial detection electrode line 51b to each other.

As illustrated in FIG. 18, the bridge line 51c is provided in the same layer as the signal lines SGL. The bridge line 51c is provided on the lower side of the first electrode 23A and is coupled to the second partial detection electrode line 51b and the first partial detection electrode line 51a via contact holes provided in the fourth insulating layer 94. Also with this configuration, the first electrodes 23A can be provided in the same layer as the detection electrode lines 51 coupled to the detection electrodes 22. The bridge line 51c is provided in a different layer from the detection electrodes 22, and thus the detection electrodes 22 may be provided in areas overlapping with at least part of the bridge line 51c. Thus, there is no need to form the notch 22b in the detection electrodes 22.

Fourth Embodiment

Figure 19:
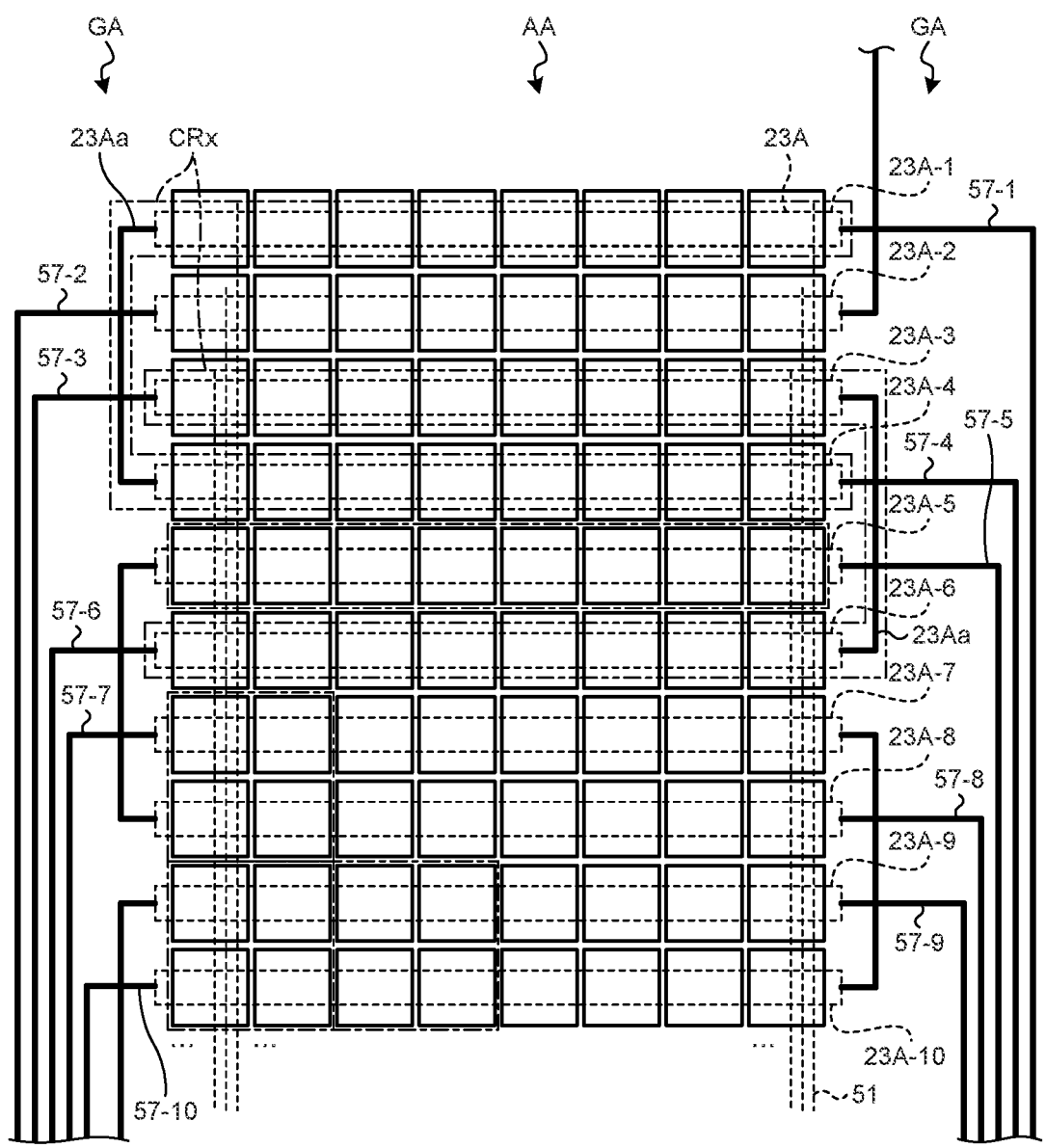
FIG. 19 is a circuit diagram of a coupling configuration of the first electrodes according to a fourth embodiment.
Figure 20:
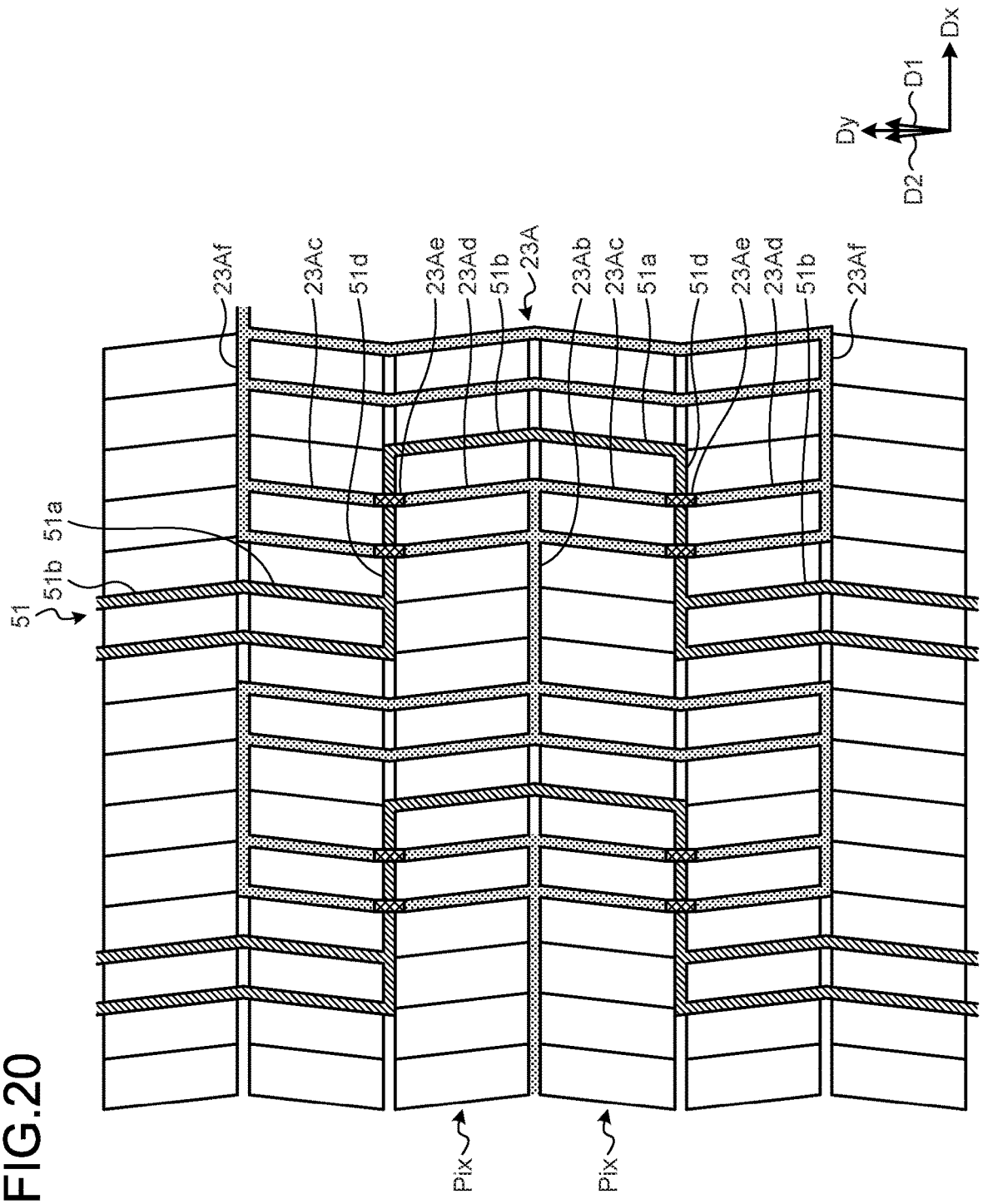
FIG. 20 is a plan view of the first electrodes and the detection electrode lines according to the fourth embodiment.

FIG. 19 is a circuit diagram of a coupling configuration of the first electrodes according to a fourth embodiment. FIG. 20 is a plan view of the first electrodes and the detection electrode lines according to the fourth embodiment. In the present embodiment, in the electromagnetic induction detection period, the first drive signal VTP is supplied to the signal lines SGL from the drive circuit 18, whereby a magnetic field is generated, and an electromotive force due to the magnetic field is generated in the first electrodes 23A. That is to say, the signal lines SGL form the transmission coils CTx, whereas the first electrodes 23A form the reception coils CRx.

As illustrated in FIG. 19, a first electrode 23A-1, a first electrode 23A-4, and a first electrode coupling line 23Aa form the reception coil CRx. A first electrode 23A-3, a first electrode 23A-6, and the first electrode coupling line 23Aa form the reception coil CRx. Like FIG. 13, one of the reception coils CRx is coupled to the reference potential, whereas the other thereof is coupled to the first detection circuit 11 to output the first detection signal Vdet1. Also in the present embodiment, the reception coils CRx adjacent to each other are placed partially overlapping with each other. The coupling configuration of the signal lines SGL can be a configuration similar to that in FIG. 13.

Like the third embodiment, the first electrodes 23A are provided in the same layer as the detection electrode lines 51. As illustrated in FIG. 20, the detection electrode line 51 includes the first partial detection electrode line 51a, the second partial detection electrode line 51b, and a crossing line part 51d. The first partial detection electrode line 51a and the second partial detection electrode line 51b coupled to each other in the second direction Dy, are main wiring line parts of the detection electrode line 51. Two crossing line parts 51d are respectively coupled to the first partial detection electrode line 51a and the second partial detection electrode line 51b and extend in the first direction Dx. The two crossing line parts 51d are placed adjacent to each other in the second direction Dy with a first main part 23Ab of the first electrode 23A therebetween and are coupled to each other in the second direction Dy by the first partial detection electrode line 51a and the second partial detection electrode line 51b at a position not overlapping with the first main part 23Ab of the first electrode 23A. Thus, the detection electrode line 51 extends in the second direction Dy as a whole.

The first electrode 23A has the first main part 23Ab, a first crossing part 23Ac, a second crossing part 23Ad, a bridge part 23Ae, and a second main part 23Af. The first main part 23Ab extends in the first direction Dx. The first crossing part 23Ac is coupled to the first main part 23Ab and is provided along the direction D1. The second crossing part 23Ad is coupled to the first main part 23Ab and is provided along the direction D2. Further, the first crossing part 23Ac and the second crossing part 23Ad are placed adjacent to each other in the second direction Dy across the crossing line part 51d of the detection electrode line 51. The bridge part 23Ae is provided crossing the crossing line part 51d in a plan view and couples the first crossing part 23Ac and the second crossing part 23Ad to each other. The bridge part 23Ae may be provided in the same layer as the detection electrodes 22 like the third embodiment or be provided in the same layer as the signal lines SGL.

Two second main parts 23Af are provided on mutually opposite sides with the crossing line part 51d and the first main part 23Ab interposed therebetween; one of the second main parts 23Af is coupled to the first crossing part 23Ac, whereas the other of the second main parts 23Af is coupled to the second crossing part 23Ad. With this configuration, the first electrode 23A extends in the first direction Dx as a whole.

The first electrodes 23A form the reception coils CRx. Even if the reception coils CRx have a higher resistance value than that of the transmission coils CTx, a decrease in detection performance can be reduced. Thus, even when the first electrode 23A is provided with the bridge part 23Ae, a decrease in the detection sensitivity in the electromagnetic induction touch detection can be reduced. On the other hand, the detection electrode lines 51 are not provided with any bridge line. Thus, in the self-capacitive touch detection, the responsiveness of the second drive signal VSELF is increased and detection sensitivity is improved.

Fifth Embodiment

Figure 21:
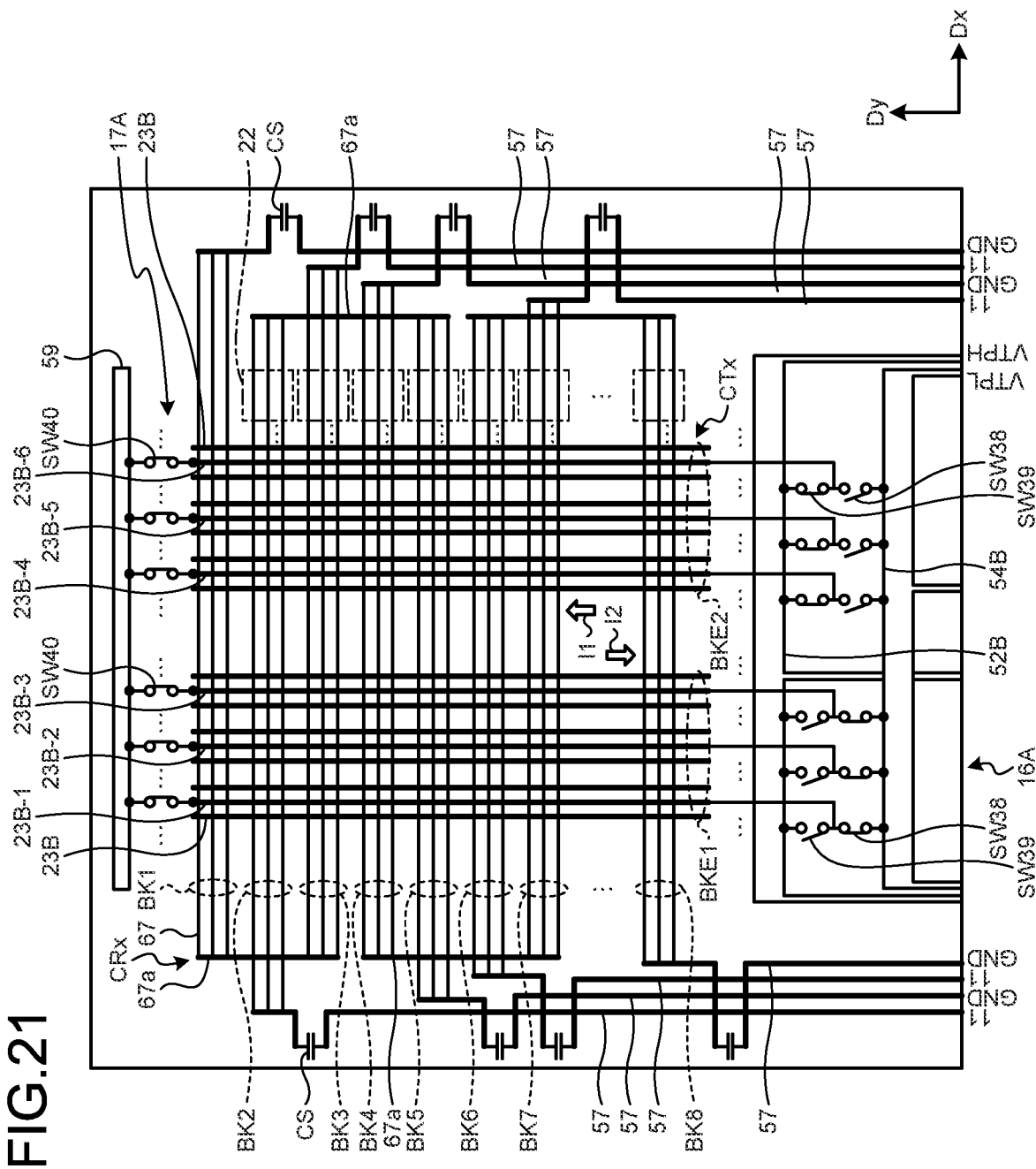
FIG. 21 is a circuit diagram of a coupling configuration of the first electrodes and second electrodes according to a fifth embodiment.
Figure 22:
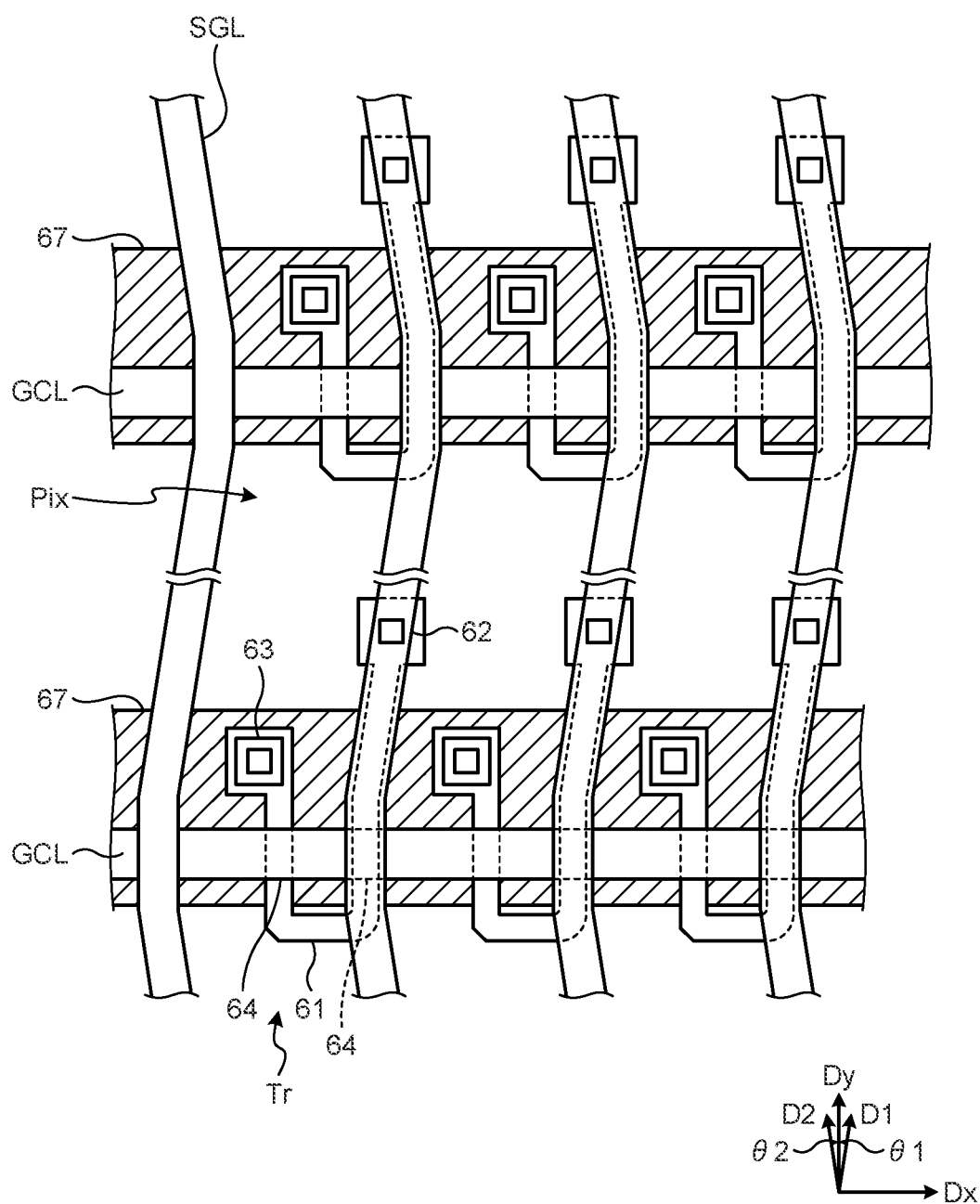
FIG. 22 is a plan view of the second electrodes according to the fifth embodiment illustrated in an enlarged manner.

FIG. 21 is a circuit diagram of a coupling configuration of the first electrodes and second electrodes according to a fifth embodiment. FIG. 22 is a plan view of the second electrodes according to the fifth embodiment illustrated in an enlarged manner. In the present embodiment, in the electromagnetic induction detection period, the first drive signal VTP is supplied to first electrodes 23B from the drive circuit 18, whereby a magnetic field is generated, and an electromotive force due to the magnetic field is generated in second electrodes 67. That is to say, the first electrodes 23B form the transmission coils CTx, whereas the second electrodes 67 form the reception coils CRx.

As illustrated in FIG. 21, the first electrodes 23B each extend in the second direction Dy and are arranged in the first direction Dx. The first electrodes 23B including first electrodes 23B-1, 23B-2, and 23B-3 are referred to as the first electrode block BKE1. The first electrodes 23B including first electrodes 23B-4, 23B-5, and 23B-6 are referred to as the first electrode block BKE2. On the upper end side of the first electrode block BKE1 and on the upper end side of the first electrode block BKE2, a first electrode coupling line 59 is provided. Switches SW40 are provided between the first electrode block BKE1 and the first electrode coupling line 59 and between the first electrode block BKE2 and the first electrode coupling line 59.

On the lower end side of the first electrode block BKE1 and on the lower end side of the first electrode block BKE2, a first drive signal supply line 52B, a second drive signal supply line 54B, switches SW38, and switches SW39 are provided. Although only part of the switches such as the switches SW40 are illustrated in order for the drawing to be easily viewed, they are provided for each of the first electrodes 23B.

In the first sensing period, the switches SW40 are turned on, and the upper ends of the first electrode block BKE1 and the first electrode block BKE2 are coupled to each other via the first electrode coupling line 59. On the lower end side of the first electrode block BKE1, the switches SW38 are turned on, whereas the switches SW39 are turned off. On the lower end side of the first electrode block BKE2, the switches SW38 are turned off, whereas the switches SW39 are turned on.

The first voltage supply circuit 18C (refer to FIG. 7) supplies the first voltage VTPH to the lower end of the first electrode block BKE2 via the first drive signal supply line 52B. The second voltage supply circuit 18D (refer to FIG. 7) supplies the second voltage VTPL to the lower end of the first electrode block BKE1 via the second drive signal supply line 54B. Thus, a potential difference is generated between the lower end of the first electrode block BKE1 and the lower end of the first electrode block BKE2 in a route formed by the first electrode block BKE1, the first electrode coupling line 59, and the first electrode block BKE2. With this potential difference, the currents I2 and I1 pass through the first electrode blocks BKE1 and BKE2, respectively.

The first detection control circuit 10 switches the operation of the switches SW38 and SW39 to change the first voltage VTPH and the second voltage VTPL to be supplied to the lower ends of the first electrode blocks BKE1 and BKE2 at a certain frequency. Thus, the first drive signal VTP as an AC voltage signal is supplied to the first electrode blocks BKE1 and BKE2.

The second electrodes 67 each extend in the first direction Dx and are arranged in the second direction Dy. Second electrode blocks BK1, BK2, . . . , BK8 each include the second electrodes 67. The left end of the second electrode block BK1 and the left end of the second electrode block BK3 are coupled to each other by a second electrode coupling line 67a. One of the right end of the second electrode block BK1 and the right end of the second electrode block BK3 is coupled to the reference potential (the ground potential GND, for example), whereas the other of them is coupled to the first detection circuit I1, via a capacitance CS and the detection signal output line 57. Thus, the second electrode block BK1, the second electrode block BK3, and the second electrode coupling line 67a form the reception coil CRx.

Similarly, the right end of the second electrode block BK2 and the right end of the second electrode block BK5 are coupled to each other by the second electrode coupling line 67a. One of the left end of the second electrode block BK2 and the left end of the second electrode block BK5 is coupled to the reference potential (the ground potential GND, for example), whereas the other of them is coupled to the first detection circuit I1, via the capacitance CS and the detection signal output line 57. Thus, the second electrode block BK2, the second electrode block BK5, and the second electrode coupling line 67a form the reception coil CRx. The second electrode block BK4, the second electrode block BK7, and the second electrode coupling line 67a form the reception coil CRx. Like FIG. 13, one of the reception coils CRx is coupled to the reference potential, whereas the other thereof is coupled to the first detection circuit 11 to output the first detection signal Vdet1.

As illustrated in FIG. 22, the gate lines GCL cross the signal lines SGL and extend in the first direction Dx. Each of the second electrodes 67 extends in the first direction Dx along the gate line GCL and is provided below the gate line GCL and the switching element Tr. The second electrodes 67 are provided continuously across the pixels Pix and the switching elements Tr arranged in the first direction Dx. The second electrode 67 is a light shielding layer and only needs to be provided at least below a portion at which the semiconductor 61 and the gate line GCL cross each other. Thus, the second electrodes 67 can reduce a light leakage current of the switching elements Tr. FIG. 22 omits the pixel electrodes 24 of the respective pixels Pix in order for the drawing to be easily viewed.

Figure 23:
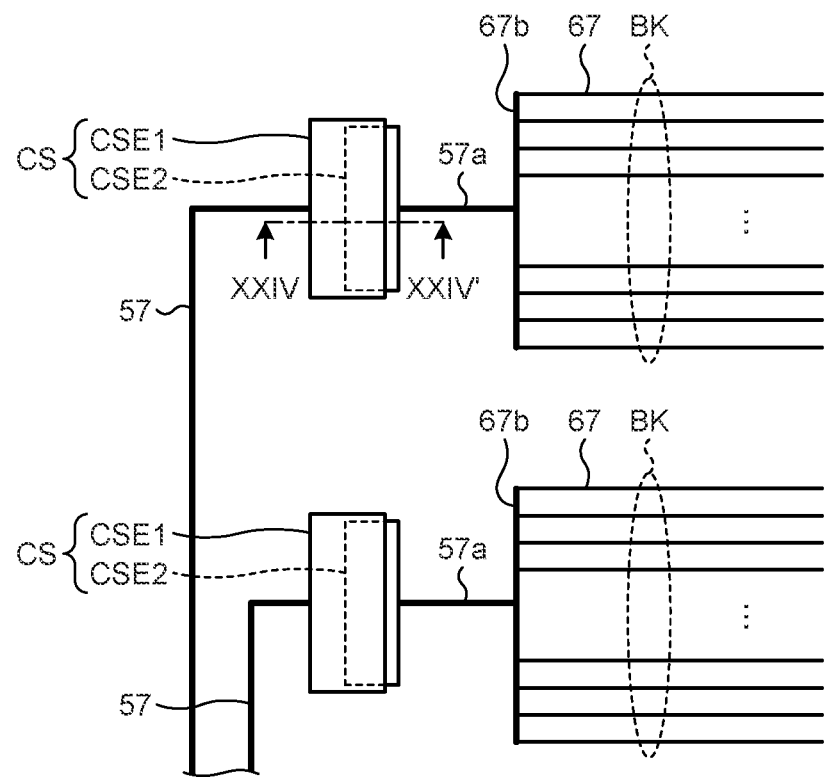
FIG. 23 is a plan view of a coupling part between the second electrodes and a detection signal output line according to the fifth embodiment illustrated in an enlarged manner.
Figure 24:
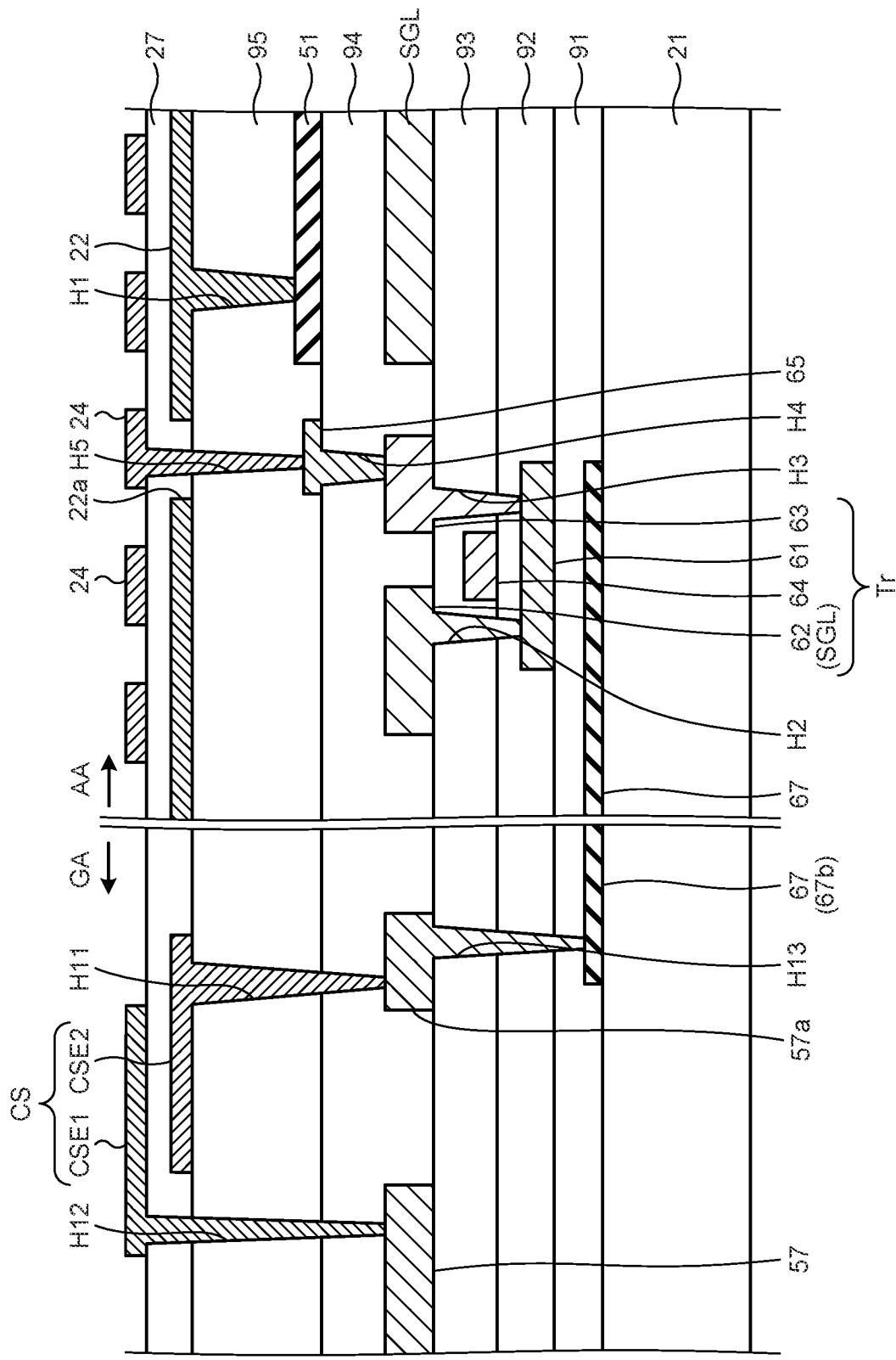
FIG. 24 is a XXIV-XXIV' sectional view of FIG. 23.

FIG. 23 is a plan view of a coupling part between the second electrodes and a detection signal output line according to the fifth embodiment illustrated in an enlarged manner. FIG. 24 is a XXIV-XXIV' sectional view of FIG. 23. FIG. 24 also illustrates a multi-layered configuration of the switching element Tr provided in the pixel Pix.

As illustrated in FIG. 23, each of the second electrode blocks BK forming the reception coils CRx is provided with the capacitance CS. The capacitance CS includes a first capacitance electrode CSE1 and a second capacitance electrode CSE2. The first capacitance electrode CSE1 and the second capacitance electrode CSE2 are provided overlapping with each other in a plan view with a dielectric (the insulating layer 27) therebetween.

The second capacitance electrode CSE2 is coupled to an end of the second electrode block BK via a relay line 57a. The second electrodes 67 of the second electrode block BK are coupled to each other by a second electrode coupling line 67b. The first capacitance electrode CSE1 is coupled to the detection signal output line 57.

As illustrated in FIG. 24, the second electrode 67 is provided between the first substrate 21 and the semiconductor 61 in the display area AA and extends to the peripheral area GA. The capacitance CS and the detection signal output line 57 are provided in the peripheral area GA. The first capacitance electrode CSE1 is provided on the insulating layer 27 and provided in the same layer as the pixel electrodes 24. The second capacitance electrode CSE2 is provided on the fifth insulating layer 95 and provided in the same layer as the detection electrodes 22. The first capacitance electrode CSE1 and the second capacitance electrode CSE2 face each other with the insulating layer 27 therebetween in the direction perpendicular to the first substrate 21. Thus, a capacitance is formed between the first capacitance electrode CSE1 and the second capacitance electrode CSE2. The layers in which the first capacitance electrode CSE1 and the second capacitance electrode CSE2 are formed may be reversed. That is to say, the second capacitance electrode CSE2 may be formed in the same layer as the pixel electrodes 24, whereas the first capacitance electrode CSE1 may be formed in the same layer as the detection electrodes 22.

The second capacitance electrode CSE2 is coupled to the relay line 57a via a contact hole H11. The relay line 57a is couple to the second electrode 67 via a contact hole H13. The first capacitance electrode CSE1 is coupled to the detection signal output line 57 via a contact hoe H12. The detection signal output line 57 and the relay line 57a are provided in the same layer as the signal lines SGL.

With this configuration, the capacitance CS is provided between each of the second electrode blocks BK and the first detection circuit 11. With the capacitance CS, current leakage of the switching elements Tr is reduced, and favorable display performance is obtained.

Figure 25:
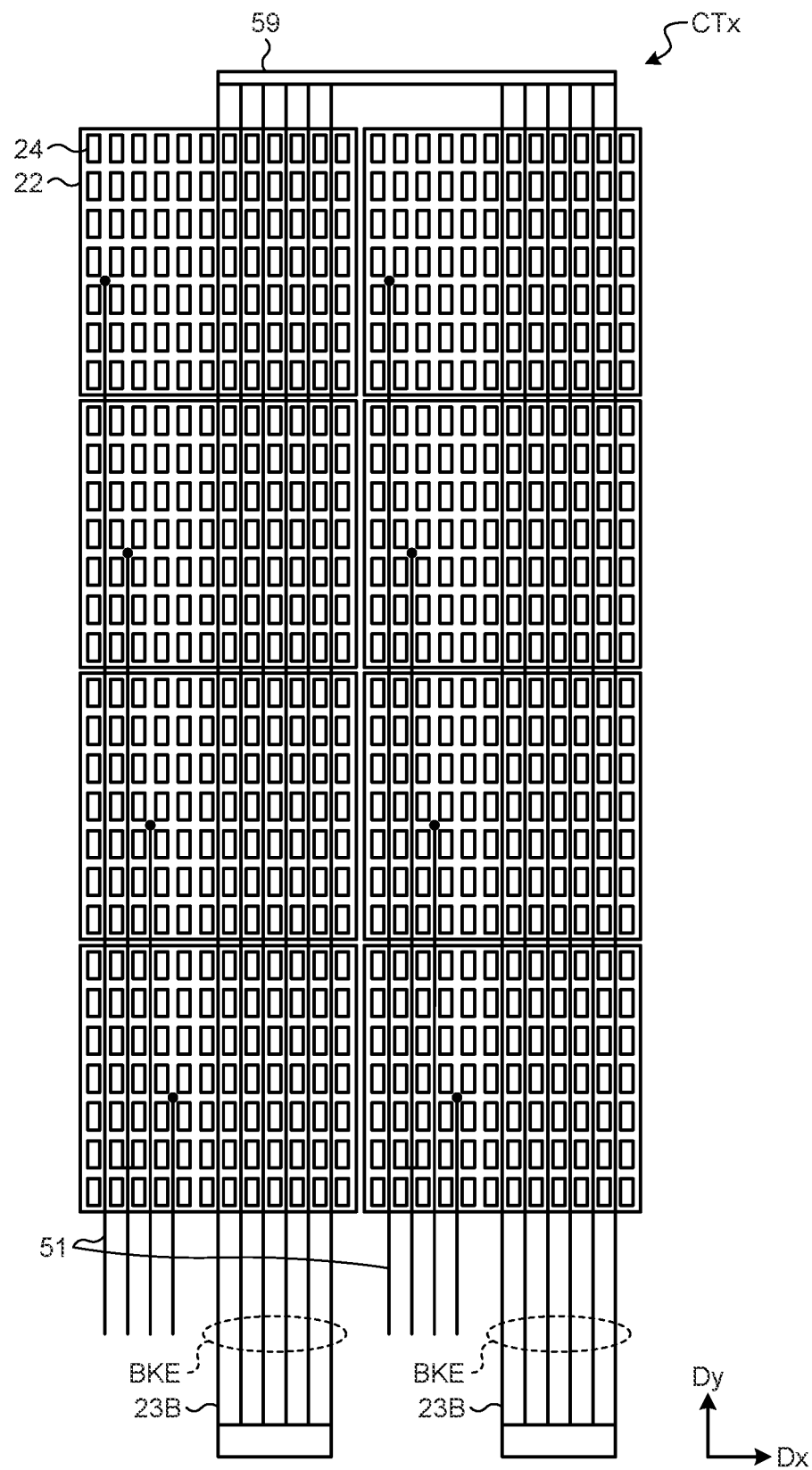
FIG. 25 is a plan view of the first electrodes and the detection electrode lines according to the fifth embodiment.

FIG. 25 is a plan view of the first electrodes and the detection electrode lines according to the fifth embodiment. The first electrodes 23B of the present embodiment are provided in the same layer as the detection electrode lines 51. In the area overlapping with the detection electrodes 22, the first electrodes 23B are provided in an area different from the area in which the detection electrode lines 51 are provided. In FIG. 25, in the area overlapping with the detection electrodes 22 arranged in the second direction Dy, the detection electrode lines 51 and the first electrode blocks BKE are provided adjacent to each other in the first direction Dx. With this configuration, the first electrode blocks BKE can form the transmission coils CTx so as to cross the reception coils CRx.

Figure 26:
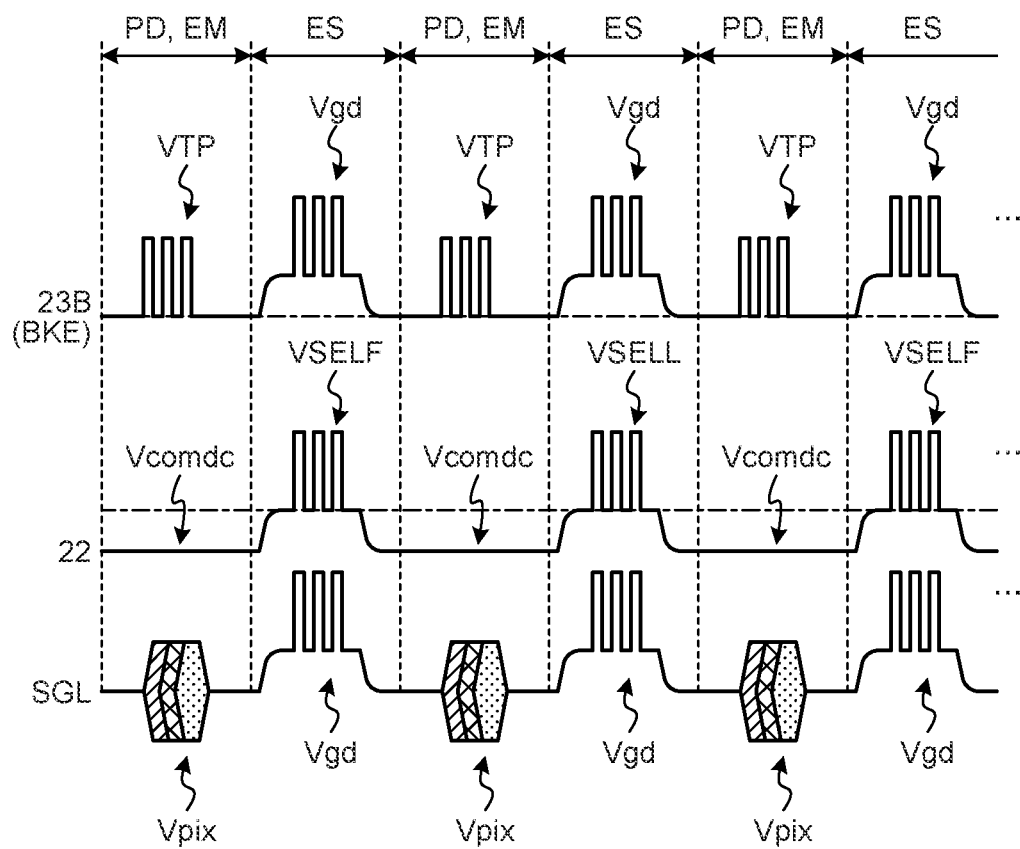
FIG. 26 is a timing waveform diagram of an operation example of the display apparatus according to the fifth embodiment.

FIG. 26 is a timing waveform diagram of an operation example of the display apparatus according to the fifth embodiment. As illustrated in FIG. 26, the display apparatus 1 performs operations of a display period PD and a second sensing period ES alternately in a time-division manner. The display apparatus 1 executes a first sensing period EM in the same period as the display period PD. The first sensing period EM is a period in which the electromagnetic induction touch detection is performed. The second sensing period ES is a period in which the self-capacitive touch detection is performed.

As illustrated in FIG. 26, in the display period PD, the display control circuit 14 (refer to FIG. 1) supplies the pixel signals Vpix to the signal lines SGL. The drive circuit 18 (refer to FIG. 7) supplies the display drive signal Vcomdc to the detection electrodes 22. Thus, the display of the display apparatus 1 is executed.

In the first sensing period EM, the drive circuit 18 supplies the first drive signal VTP to the first electrode blocks BKE forming the transmission coils CTx. The drive circuit 18 alternately supplies the first voltage VTPH and the second voltage VTPL to both ends of the transmission coils CTx to supply the first drive signal VTP as an AC voltage signal to the first electrode blocks BKE. Thus, an electromotive force due to a magnetic field is generated in the second electrodes 67 forming the reception coils CRx. Thus, the first detection signals Vdet1 are output to the first detection circuit 11.

In the second sensing period ES, the drive circuit 18 supplies the second drive signal VSELF to the detection electrodes 22. The detection electrodes 22 output the second detection signals Vdet2 corresponding to the self-capacitance of the detection electrodes 22 to the second detection circuit 13 (refer to FIG. 1). The drive circuit 18 supplies a guard drive signal Vgd to the signal lines SGL and the first electrodes 23B. The guard drive signal Vgd is an AC rectangular wave having at least the same amplitude as that of the second drive signal VSELF. The guard drive signal Vgd may be an Ac rectangular wave having the same potential and the same phase, for example. Thus, the display apparatus 1 can hamper capacitance coupling between the signal lines SGL and the first electrodes 23B, and the detection electrodes 22.

The timing waveform diagram illustrated in FIG. 26 is only by way of example and can be changed as appropriate. The lengths of the display period PD and the first sensing period EM and the length of the second sensing period ES may be different from one another, for example. The operation of the display period PD and the operation of the first sensing period EM may be performed in different periods. The order of the display period PD, the first sensing period EM, and the second sensing period ES can be changed as appropriate. Only one of the first sensing period EM and the second sensing period ES may be placed in one frame period.

Modification of Fifth Embodiment

Figure 27:
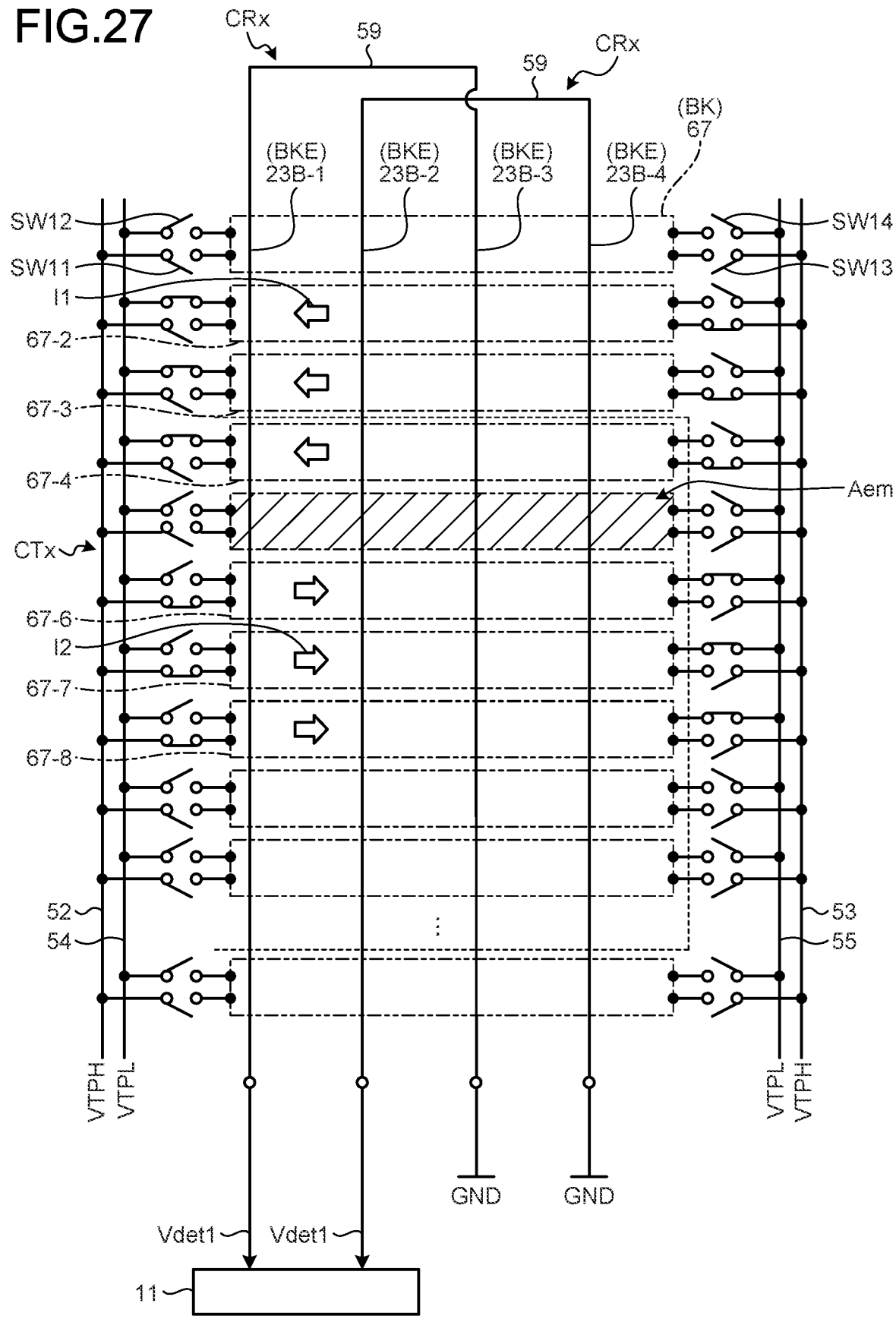
FIG. 27 is a circuit diagram of a coupling configuration of the first electrodes and the second electrodes according to a modification of the fifth embodiment.

FIG. 27 is a circuit diagram of a coupling configuration of the first electrodes and the second electrodes according to a modification of the fifth embodiment. In the display apparatus 1 of the present modification, in the first sensing period EM, the first drive signal VTP is supplied to the second electrodes 67 from the drive circuit 18 to generate a magnetic field, and an electromotive force due to the magnetic field is generated in the first electrodes 23B. That is to say, the first electrodes 23B form the reception coils CRx, whereas the second electrodes 67 form the transmission coils CTx. Like FIG. 10, one of the reception coils CRx is coupled to the reference potential (the ground potential GND, for example), whereas the other thereof is coupled to the first detection circuit 11 to output the first detection signal Vdet1.

The coupling configuration of the first electrodes 23B and the second electrodes 67 is similar to the configuration illustrated in FIG. 6 and FIG. 10 of the first embodiment. That is to say, the first voltage VTPH and the second voltage VTPL are alternately supplied to both ends of the second electrodes 67 from the drive circuit 18 via the first drive signal supply lines 52 and 53 and the second drive signal supply lines 54 and 55. With this operation, the first drive signal VTP is supplied to the transmission coils CTx, and a magnetic field is generated. The upper ends of the first electrodes 23B are coupled to each other by the first electrode coupling line 59 to form the reception coils CRx. Electromotive force due to the magnetic field is generated in the reception coils CRx. The lower ends of the first electrodes 23B are coupled to the first detection circuit 11, and the first detection signals Vdet1 are output to the first detection circuit 11.

Sixth Embodiment

Figure 28:
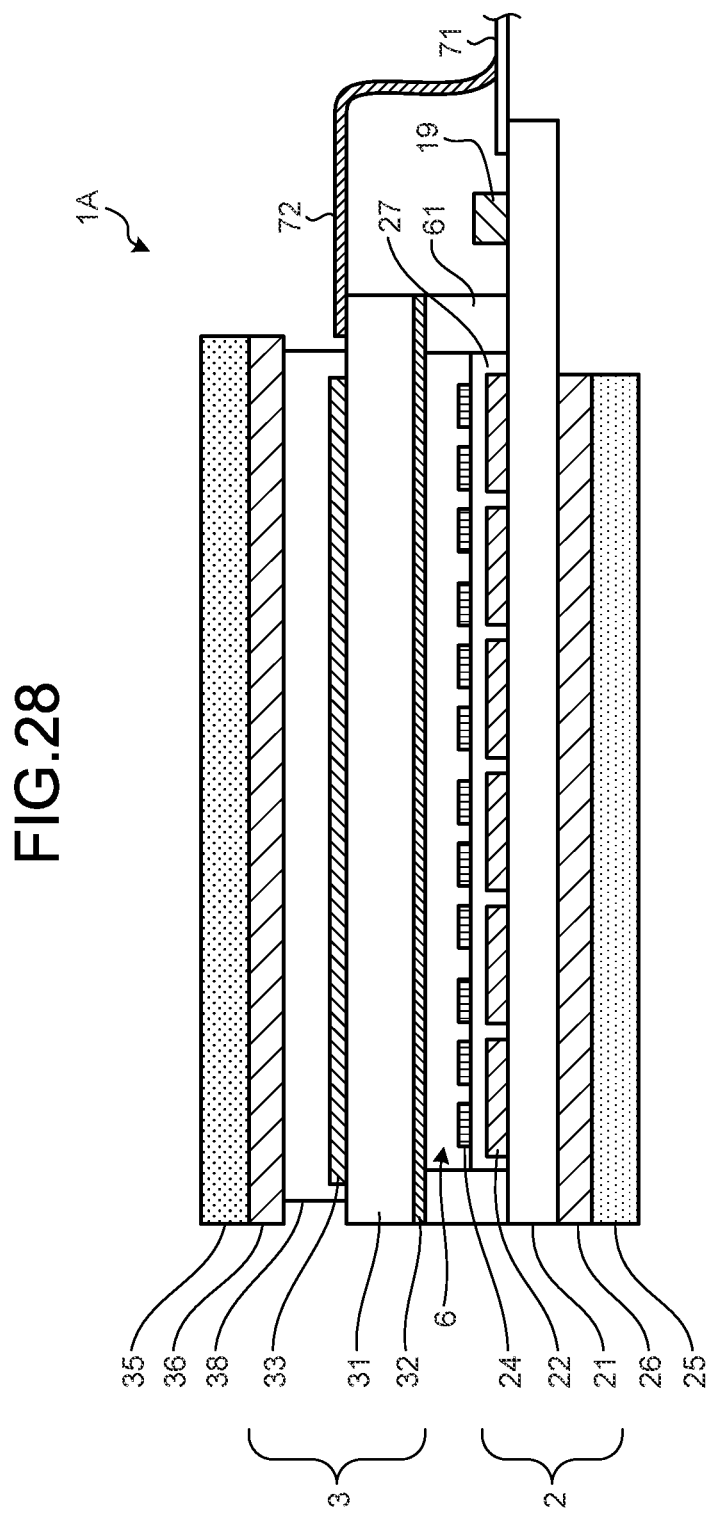
FIG. 28 is a sectional view of a schematic structure of a display apparatus according to a sixth embodiment.
Figure 29:
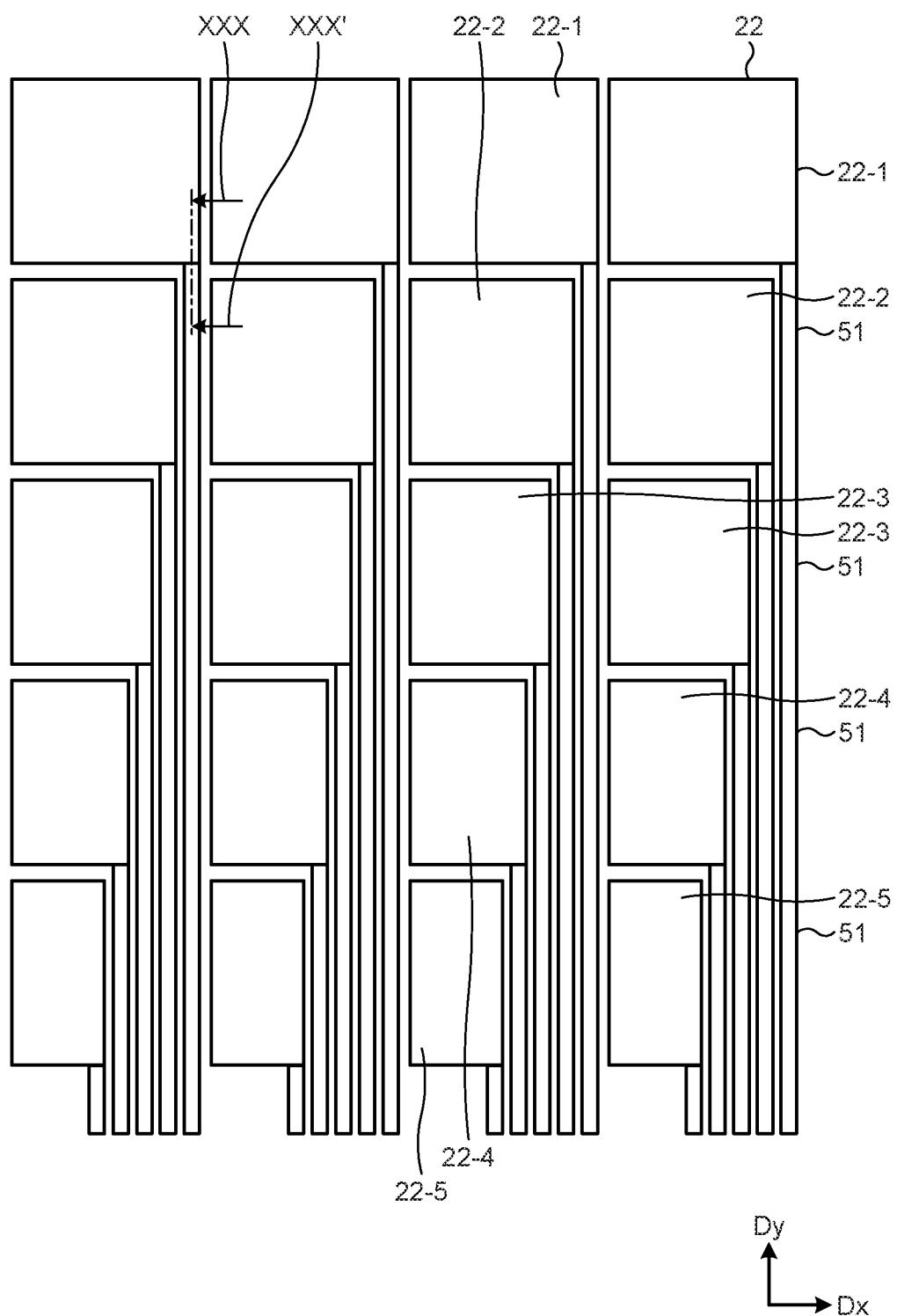
FIG. 29 is a plan view of the detection electrodes and the detection electrode lines according to the sixth embodiment.
Figure 30:
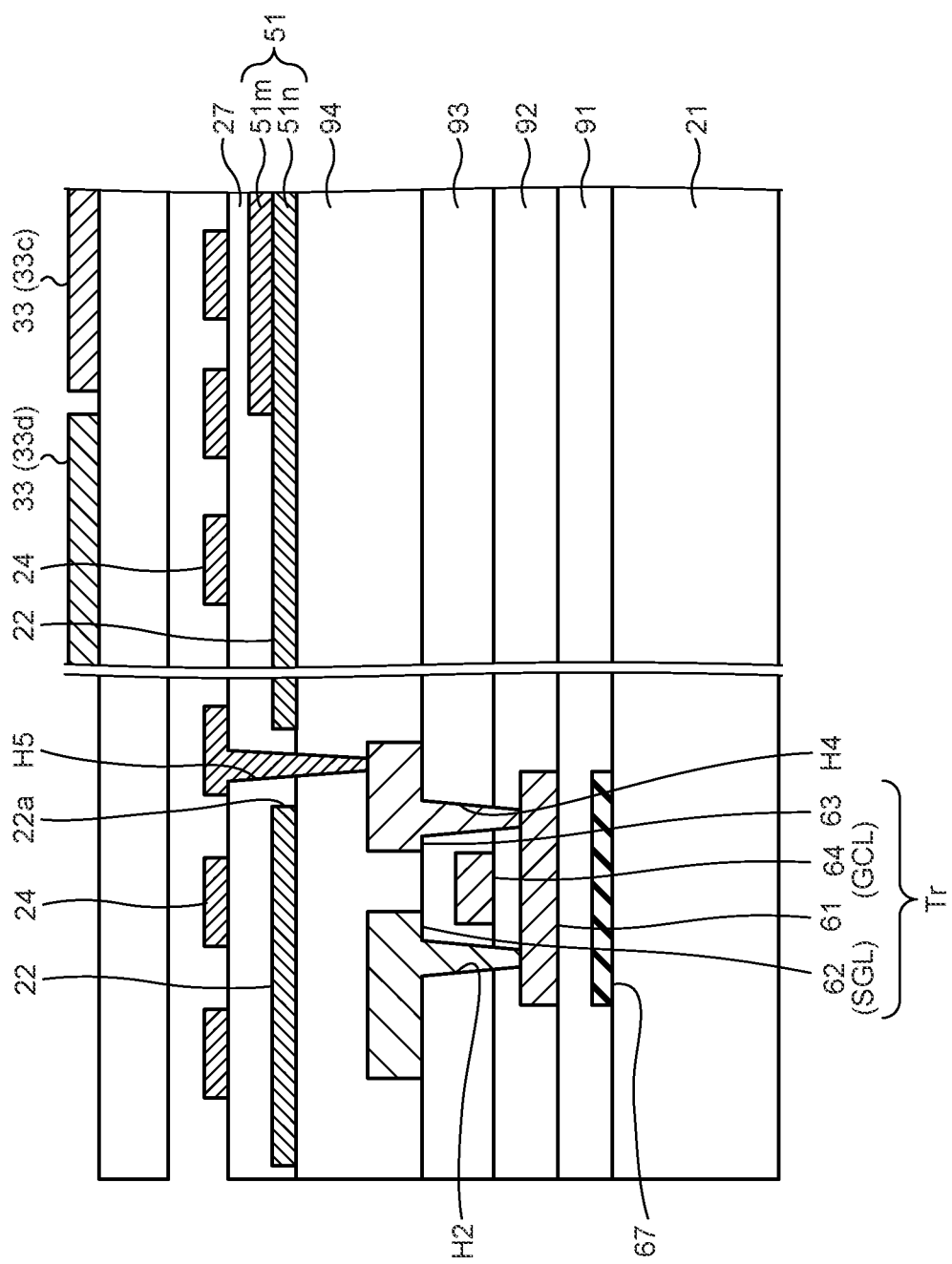
FIG. 30 is a XXX-XXX' sectional view of FIG. 29.
Figure 31:
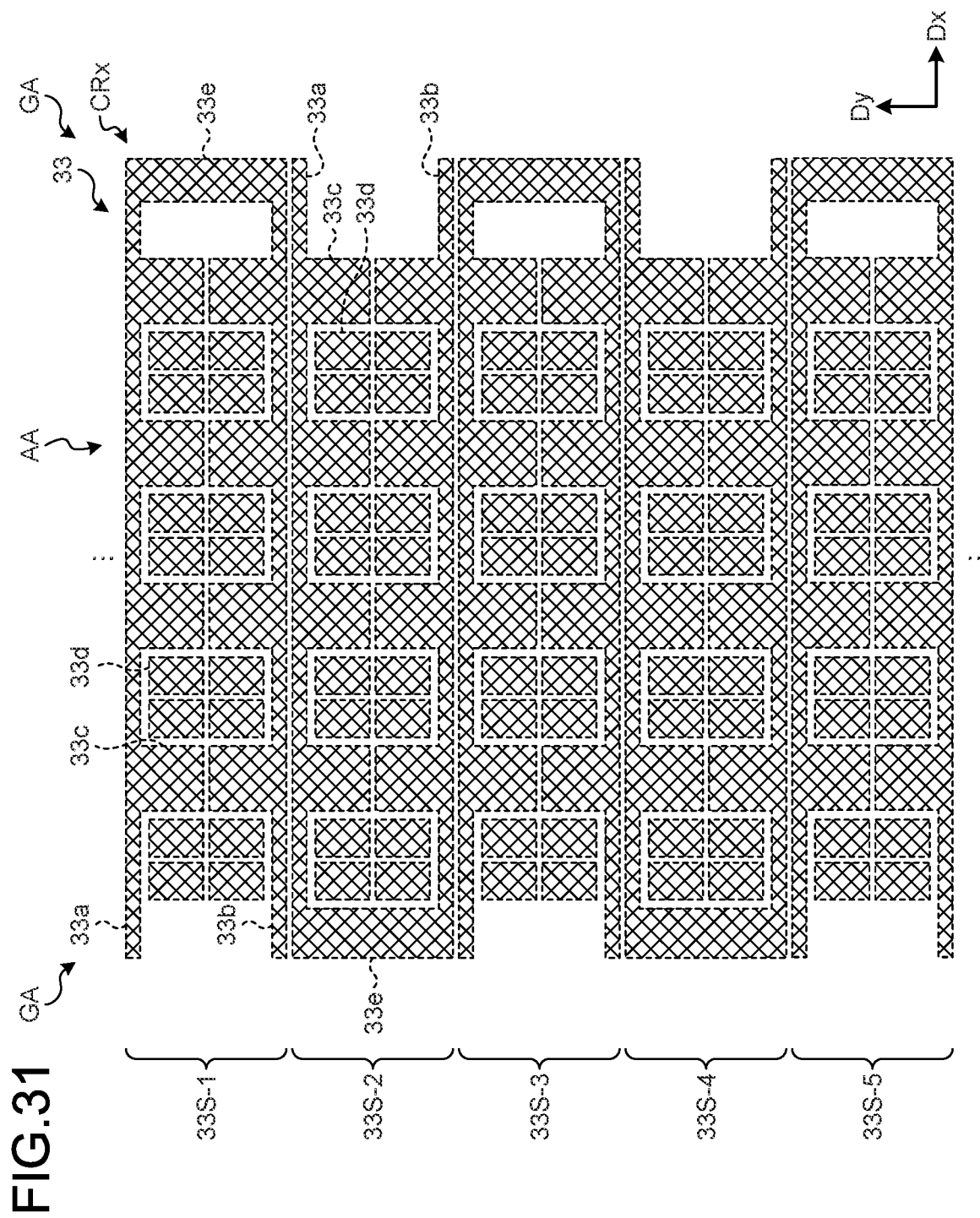
FIG. 31 is a plan view of guard electrodes according to the sixth embodiment.

FIG. 28 is a sectional view of a schematic structure of a display apparatus according to a sixth embodiment. FIG. 29 is a plan view of the detection electrodes and the detection electrode lines according to the sixth embodiment. FIG. 30 is a XXX-XXX' sectional view of FIG. 29. FIG. 31 is a plan view of guard electrodes according to the sixth embodiment.

In a display apparatus 1A of the present embodiment, a shield electrode 33 are provided on the second substrate 31. In other words, the shield electrode 33 is provided on the upper sides of the detection electrodes 22 in the direction perpendicular to the first substrate 21. Further, a protective layer 38 is provided on the shield electrode 33. The polarizing plate 35 is provided on the protective layer 38 via the adhesive layer 36. A wiring substrate 72 is provided to the second substrate 31. The shield electrode 33 is coupled to the first detection control circuit 10 and the second detection control circuit 12 of the drive IC 19 via the wiring substrate 71 and the wiring substrate 72. The wiring substrate 72 is a flexible printed board, for example.

As illustrated in FIG. 29, the detection electrode lines 51 are provided in areas not overlapping with the detection electrodes 22 and extend in the second direction Dy. The detection electrodes 22 arranged in the second direction Dy are named detection electrodes 22-1, 22-2, 22-3, 22-4, and 22-5. The detection electrode 22-2 is adjacent to one detection electrode line 51 coupled to the detection electrode 22-1. The detection electrode 22-3 is adjacent to two detection electrode lines 51 respectively coupled to the detection electrode 22-1 and the detection electrode 22-2. Thus, the detection electrodes 22-1, 22-2, 22-3, 22-4, and 22-5 are arranged in descending order of width in the first direction Dx.

As illustrated in FIG. 30, the detection electrode line 51 is provided on the fourth insulating layer 94 to be in the same layer as the detection electrodes 22. The detection electrode line 51 includes a translucent conductive layer 51n and a metallic layer 51m. The translucent conductive layer 51n is provided on the fourth insulating layer 94, and the same material as that of the detection electrodes 22, or a conductive material having translucency such as ITO, is used for translucent conductive layer 51n. The metallic layer 51m is provided on the translucent conductive layer 51n. In the present embodiment, the detection electrode lines 51 and the detection electrodes 22 are provided in the same layer, and thus the fifth insulating layer 95 can be omitted compared with the first embodiment and the like.

As illustrated in FIG. 31, the shield electrode 33 includes a plurality of individual shield electrodes 33S-1, 33S-2, 33S-3, 33S-4, 33S-5, . . . . The individual shield electrodes 33S-1, 33S-2, 33S-3, 33S-4, 33S-5, . . . are arranged in the second direction Dy. In the following description, where there is no need to discriminate the individual shield electrodes 33S-1, 33S-2, 33S-3, 33S-4, and 33S-5 from each other, they are represented as an individual shield electrode 33S.

The individual shield electrode 33S-1 includes a first shield line 33a, a second shield line 33b, third shield lines 33c, a dummy line 33d, and a coupling line 33e. The parts forming the individual shield electrode 33S-1 each includes a plurality of metallic lines, and the metallic lines are formed in a mesh shape. The metallic lines of the parts of the individual shield electrode 33S-1 may be of another shape such as a zigzag shape, a wavy shape, or a linear shape.

The first shield line 33a and the second shield line 33b each extend in the first direction Dx and are arranged adjacent to each other in the second direction Dy. The third shield lines 33c are provided between the first shield line 33a and the second shield line 33b and are coupled to the first shield line 33a and the second shield line 33b. The third shield lines 33c are arranged along the first shield line 33a and the second shield line 33b. The third shield lines 33c adjacent to each other in the second direction Dy are separated from each other by a slit.

The first shield line 33a and the second shield line 33b are provided across the display area AA and the peripheral area GA. In the individual shield electrode 33S-1, the right end of the first shield line 33a and the right end of the second shield line 33b are coupled to each other by the coupling line 33e in the peripheral area GA. The dummy line 33d is provided in an area surrounded by the first shield line 33a, the second shield line 33b, and the third shield lines 33c. The dummy line 33d is not coupled to the first shield line 33a, the second shield line 33b, and the third shield lines 33c and is in a floating state.

In the individual shield electrode 33S-2, the left end of the first shield line 33a and the left end of the second shield line 33b are coupled to each other by the coupling line 33e in the peripheral area GA. In the individual shield electrode 33S-3, the right end of the first shield line 33a and the right end of the second shield line 33b are coupled to each other by the coupling line 33e in the peripheral area GA. Thus, the individual shield electrodes 33S arranged in the second direction Dy are provided with the position of the coupling line 33e alternated.

As illustrated in FIG. 30, the dummy line 33d is placed on the upper sides of the detection electrodes 22. The third shield lines 33c are placed on the upper sides of the detection electrode lines 51. In the second sensing period ES, the drive circuit 18 supplies the guard drive signal Vgd to each of the individual shield electrodes 33S. Thus, capacitance coupling between the detection electrode lines 51 and the detection target body is hampered. The floating dummy line 33d is provided on the upper sides of the detection electrodes 22. Thus, the detection electrodes 22 can favorably perform the self-capacitive touch detection.

In the present embodiment, in the first sensing period EM, the signal lines SGL are formed as the transmission coils CTx, whereas the shield electrodes 33 are formed as the reception coils CRx. As the coupling configuration of the signal lines SGL, a configuration similar to that in FIG. 13 of the second embodiment can be used.

In the individual shield electrode 33S each, the first shield line 33a, the second shield line 33b, and the coupling line 33e are coupled to each other so as to form a loop as the reception coil CRx. One of the ends of the individual shield electrode 33S opposite to the coupling line 33e is coupled to the reference potential (the ground potential GND, for example), whereas the other thereof is coupled to the first detection circuit 11 via the wiring substrate 71 and the wiring substrate 72. Thus, an electromotive force is generated in the reception coils CRx due to a magnetic field, and the first detection signals Vdet1 are output to the first detection circuit 11.

Modification of Sixth Embodiment

Figure 32:
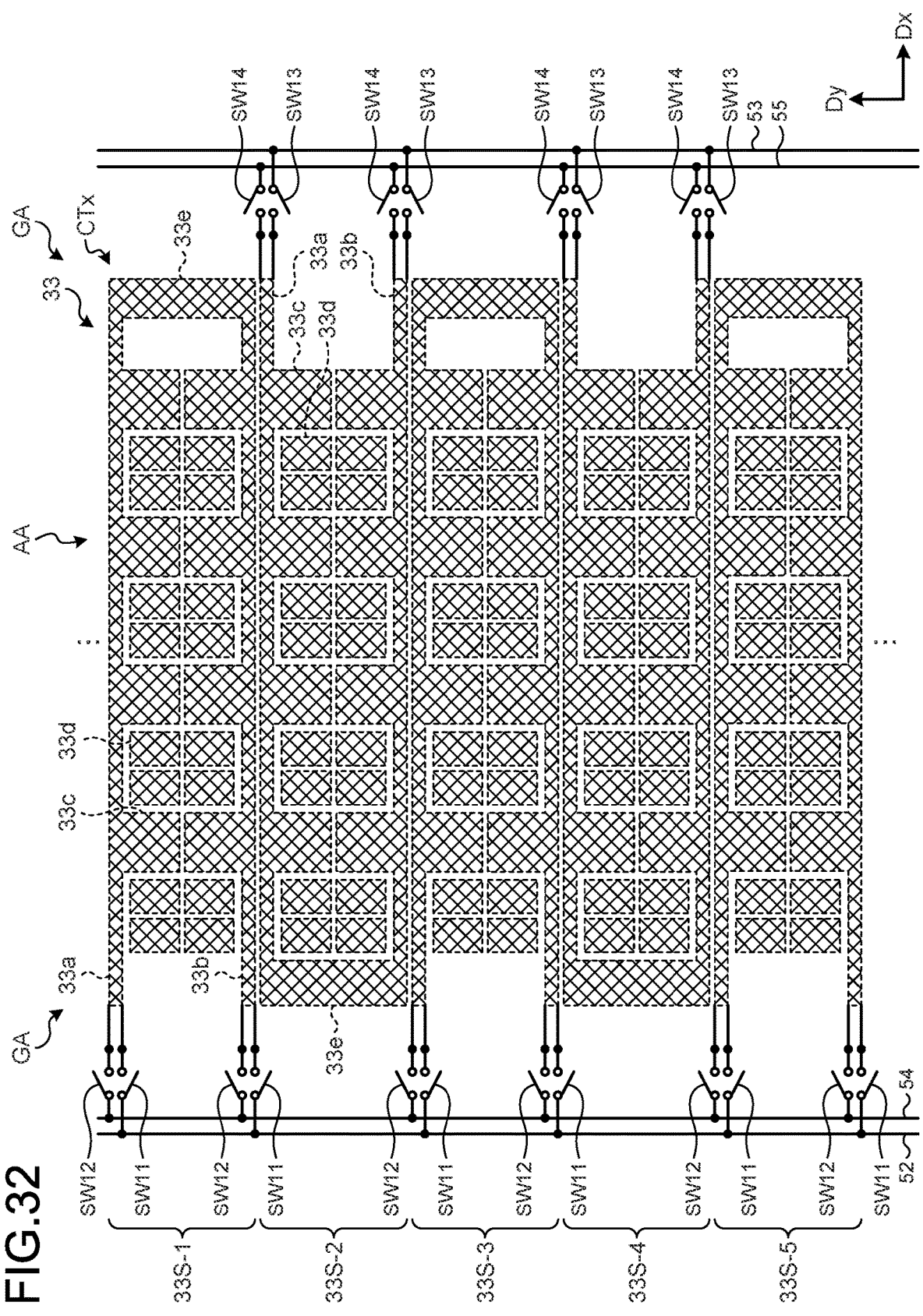
FIG. 32 is a plan view of the guard electrodes according to a modification of the sixth embodiment.

FIG. 32 is a plan view of the guard electrodes according to a modification of the sixth embodiment. In the present modification, the signal lines SGL function as the transmission coils CTx, whereas the shield electrodes 33 are formed as the reception coils CRx. The configuration of the shield electrode 33 is similar to that in FIG. 31, and a detailed description is omitted.

As illustrated in FIG. 32, the first drive signal supply line 52, the second drive signal supply line 54, and the switches SW11 and SW12 are provided on the left sides of the shield electrodes 33. The switches SW11 and SW12 are coupled to the respective first shield lines 33a and the respective second shield lines 33b of the individual shield electrodes 33S-1, 33S-3, and 33S-5. The first drive signal supply line 53, the second drive signal supply line 55, and the switches SW13 and SW14 are provided on the right sides of the shield electrodes 33. The switches SW13 and SW14 are coupled to the respective first shield lines 33a and the respective second shield lines 33b of the individual shield electrodes 33S-2 and 33S-4.

In the individual shield electrodes 33S-1, 33S-3, and 33S-5, the switches SW11 coupled to the respective first shield lines 33a are turned on, whereas the switches SW12 coupled thereto are turned off, for example, by the first detection control circuit 10. At this time, the switches SW11 coupled to the respective second shield lines 33b are turned off, whereas the switches SW12 coupled thereto are turned on. Alternatively, the switches SW12 coupled to the respective first shield lines 33a are turned on, whereas the switches SW11 coupled thereto are turned off. At this time, the switches SW12 coupled to the respective second shield lines 33b are turned off, whereas the switches SW11 coupled thereto are turned on. Thus, a potential difference is generated between the left end of the first shield line 33a and the left end of the second shield line 33b, and the current I1 passes through the first shield line 33a, the coupling line 33e, and the second shield line 33b. The same can apply to the individual shield electrodes 33S-2 and 33S-4.

The first detection control circuit 10 switches the operation of the switches SW11, SW12, SW13, and SW14 to change, at a certain frequency, the first voltage VTPH and the second voltage VTPL to be supplied to both ends of the individual shield electrodes 33S. Thus, the first drive signal VTP as an AC voltage signal is supplied to the individual shield electrodes 33S. Like FIG. 10, one of the signal lines SGL is coupled to the reference potential (the ground potential GND, for example), whereas the other thereof is coupled to the first detection circuit 11. Thus, the signal lines SGL form the reception coils CRx, an electromotive force is generated in the reception coils CRx due to a magnetic field, and the first detection signals Vdet1 are output to the first detection circuit 11.

Preferred embodiments of the present disclosure have been described; the present disclosure is not limited to such embodiments. The details disclosed in the embodiments are only by way of example, and various modifications can be made to the extent that they do not depart from the gist of the present disclosure. Appropriate modifications made to the extent that they do not depart from the gist of the present disclosure also naturally belong to the technical scope of the present disclosure. To the extent of not departing from the gist of the embodiments and modifications described above, at least one of various omissions, replacements, and modifications of the components can be made.

What is claimed is:

1. A display apparatus comprising:
   a substrate;
   a plurality of pixel electrodes;
   a plurality of detection electrodes arranged in a matrix in a display area of the substrate;
   a plurality of detection electrode lines coupled to the respective detection electrodes;
   a plurality of first electrodes provided in the same layer as the detection electrodes or the detection electrode lines and extending in a first direction;
   a plurality of switching elements coupled to the respective pixel electrodes;

a plurality of signal lines coupled to the switching elements and extending in a second direction crossing the first direction;

a coupling member provided in a peripheral area outside the display area and configured to couple ends of the first electrodes to each other; and a drive circuit configured to output a first drive signal in a first sensing period in which an electromagnetic induction method is used, wherein the detection electrode lines extend in the second direction, the first electrodes are provided in the same layer as the detection electrode lines and cross the detection electrode lines in a plan view, each of the detection electrode lines includes a first partial detection electrode line and a second partial detection electrode line, and the first partial detection electrode line and the second partial detection electrode line are placed adjacent to each other in the second direction with a corresponding one of the first electrodes therebetween and are electrically coupled to each other via a bridge line provided in a different layer from the detection electrode lines.

2. The display apparatus according to claim 1, wherein the bridge line is provided in the same layer as the detection electrodes.

3. The display apparatus according to claim 1, wherein
each of the first partial detection electrode line and the second partial detection electrode line is placed overlapping with the signal lines in a plan view and includes a coupling part provided at a position not overlapping with the signal lines, and the bridge line is provided in the same layer as the signal lines and couples the coupling part of the first partial detection electrode line and the coupling part of the second partial detection electrode line to each other.

* * * * *